(12) United States Patent
Kismarton et al.

(10) Patent No.: US 11,529,902 B2
(45) Date of Patent: Dec. 20, 2022

(54) CARGO RESTRAINT SYSTEM

(71) Applicant: THE BOEING COMPANY, Chicago, IL (US)

(72) Inventors: Max U. Kismarton, Renton, WA (US); Steven R. Kent, Downey, CA (US)

(73) Assignee: THE BOEING COMPANY, Chicago, IL (US)

( * ) Notice: Subject to any disclaimer, the term of this patent is extended or adjusted under 35 U.S.C. 154(b) by 436 days.

(21) Appl. No.: 16/546,822

(22) Filed: Aug. 21, 2019

(65) Prior Publication Data

US 2019/0375327 A1 Dec. 12, 2019

Related U.S. Application Data

(62) Division of application No. 15/388,675, filed on Dec. 22, 2016, now Pat. No. 10,391,921.

(51) Int. Cl.

| | |
|---|---|
| *B60P 7/13* | (2006.01) |
| *B60P 7/135* | (2006.01) |
| *B60P 7/18* | (2006.01) |
| *B61D 3/16* | (2006.01) |
| *B61D 45/00* | (2006.01) |
| *B61D 3/20* | (2006.01) |
| *B65D 88/12* | (2006.01) |
| *B65D 90/00* | (2006.01) |
| *B62D 33/02* | (2006.01) |

(52) U.S. Cl.
CPC ............. *B60P 7/13* (2013.01); *B60P 7/135* (2013.01); *B60P 7/18* (2013.01); *B61D 3/16* (2013.01); *B61D 3/20* (2013.01); *B61D 45/00* (2013.01); *B61D 45/002* (2013.01); *B61D 45/007* (2013.01); *B62D 33/02* (2013.01); *B65D 88/12* (2013.01); *B65D 90/0006* (2013.01); *B65D 90/0013* (2013.01); *B65D 90/0026* (2013.01)

(58) Field of Classification Search
CPC .... B60P 7/13; B60P 7/135; B60P 7/18; B60P 7/10; B64D 9/003
USPC ... 410/69, 70, 73, 74, 76, 77, 80, 82, 83, 91
See application file for complete search history.

(56) References Cited

U.S. PATENT DOCUMENTS

| | | |
|---|---|---|
| 3,557,710 A | 1/1971 | Miller |
| 3,630,155 A | 12/1971 | Marulic et al. |
| 4,826,371 A * | 5/1989 | Brown ............. B60P 7/13 410/72 |
| 7,261,257 B2 | 8/2007 | Helou, Jr. |
| 7,891,608 B2 | 2/2011 | Rawdon et al. |

(Continued)

OTHER PUBLICATIONS rittps://enwikipedia.org/wikiffwistlock, accessed Dec. 22, 2016.

*Primary Examiner* — Stephen T Gordon
(74) *Attorney, Agent, or Firm* — Patterson + Sheridan, LLP

(57) ABSTRACT

An apparatus, a vehicle and a method for securing intermodal cargo containers is provided. Couplers include pins and bottom supports to engage apertures and bottom surfaces of corner fittings for intermodal cargo containers. The couplers may also include sidewall supports to engage forward facing side surfaces of the corner fittings. The pins, bottom supports, and sidewall supports hold an intermodal cargo container in place through a relatively large range of acceleration forces without damaging the corner fittings of the intermodal cargo containers. The couplers are selectively movable from a retracted position to an extended position to engage the corner fittings of the intermodal cargo containers.

20 Claims, 17 Drawing Sheets

(56) References Cited

U.S. PATENT DOCUMENTS 10,391,921 B2\* 8/2019 Kismarton .............. B60P 7/135
2018/0178709 A1 6/2018 Kismarton et al.

\* cited by examiner

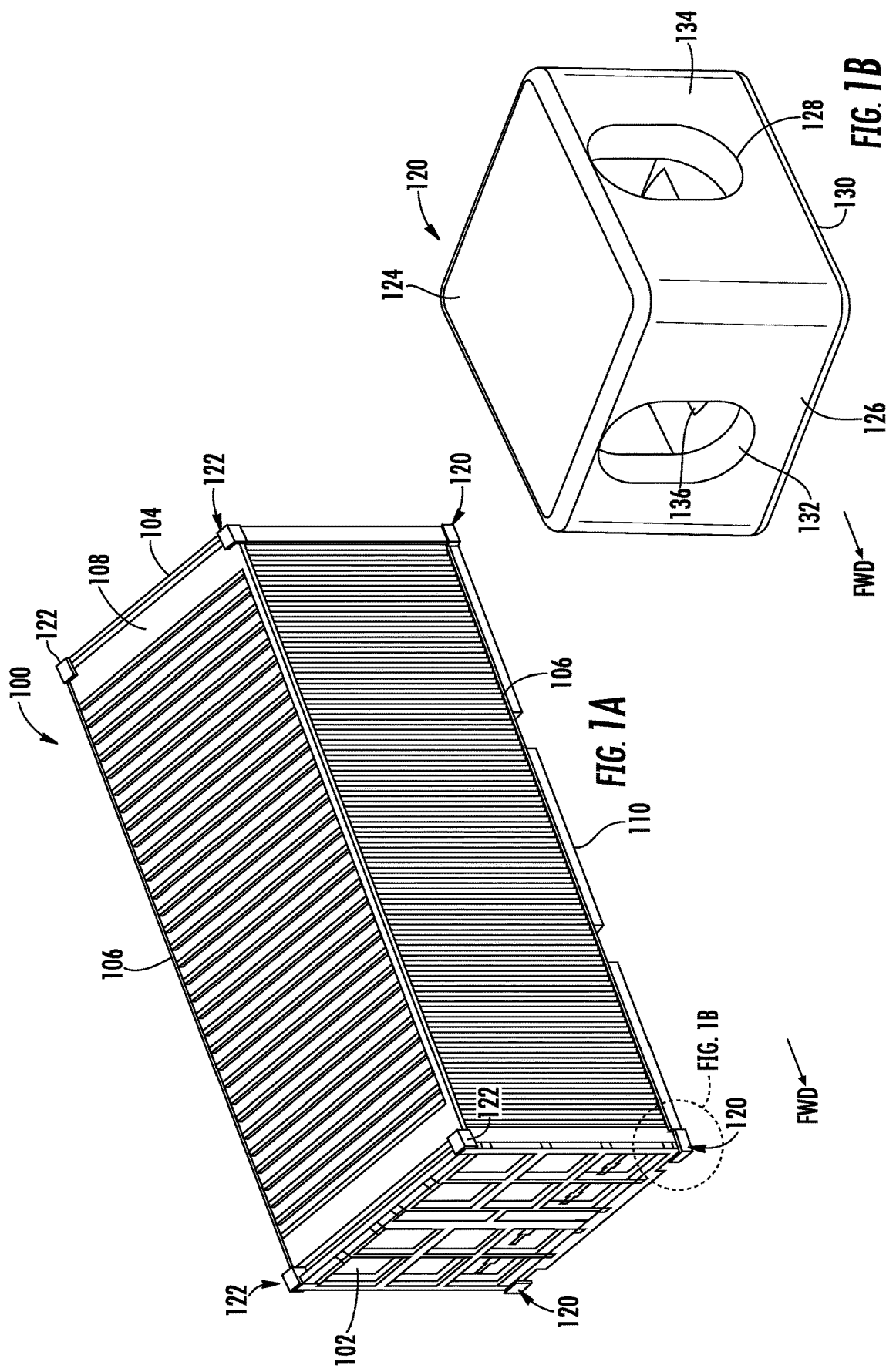

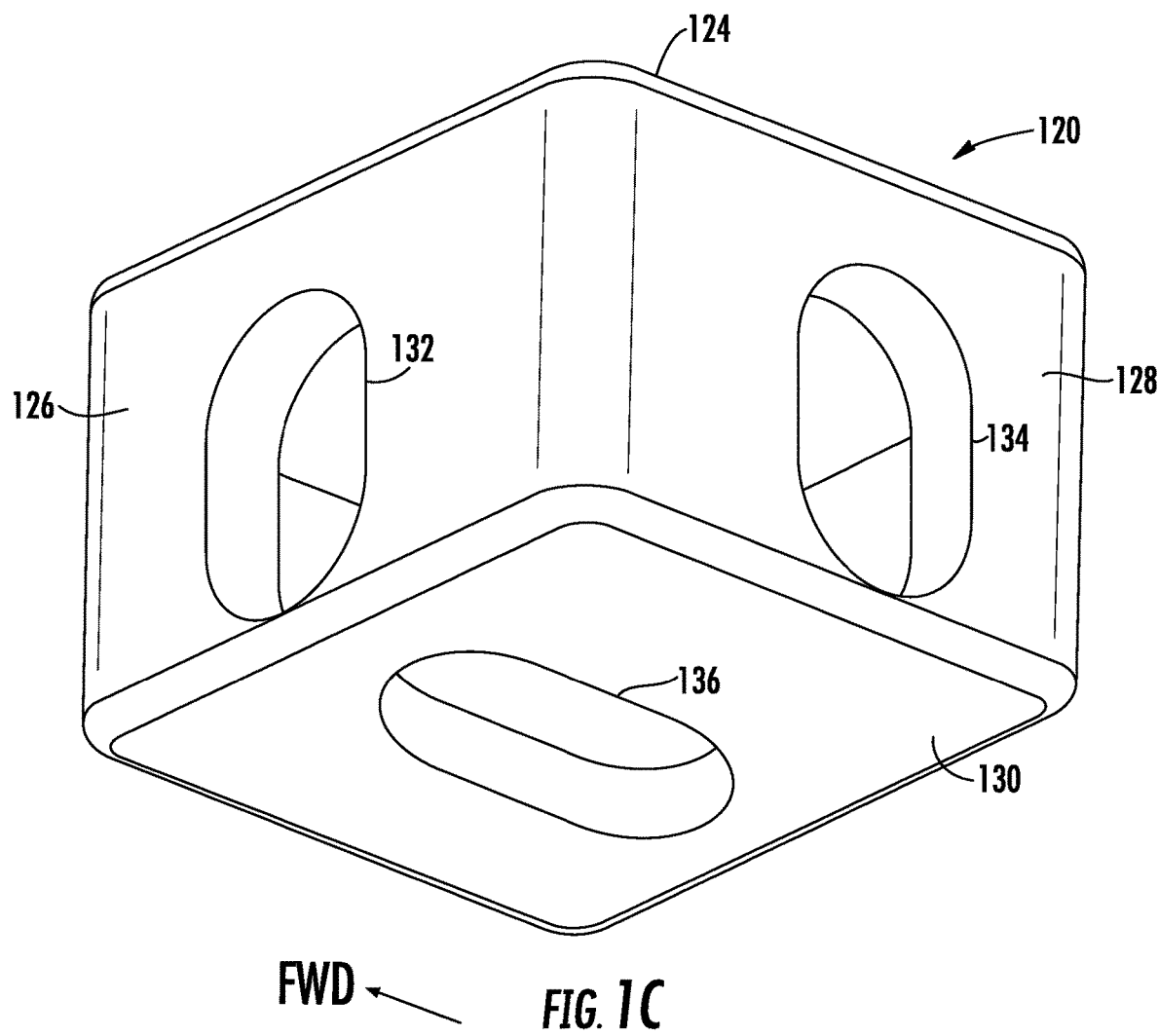
FWD ← FIG. 1C

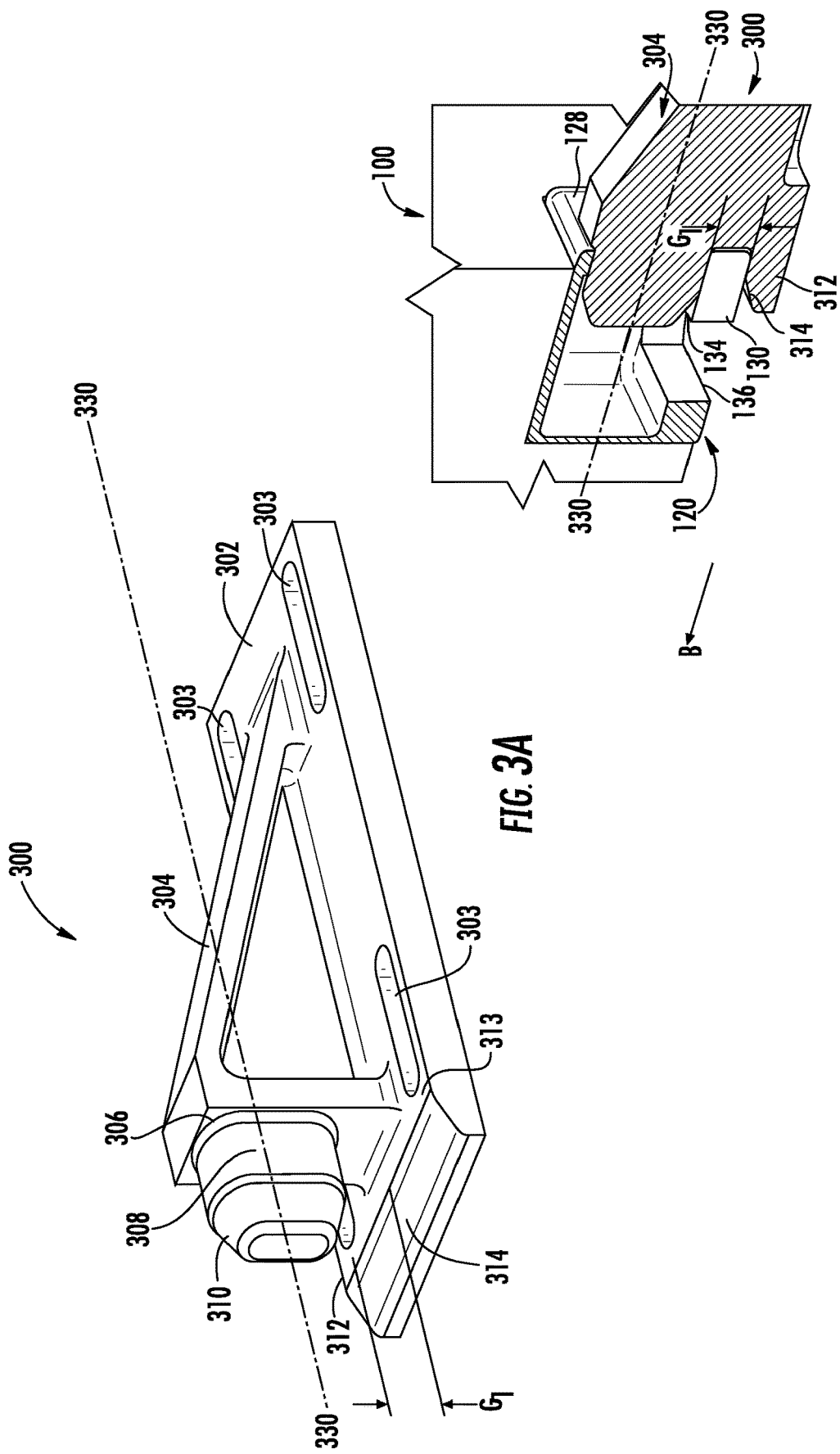

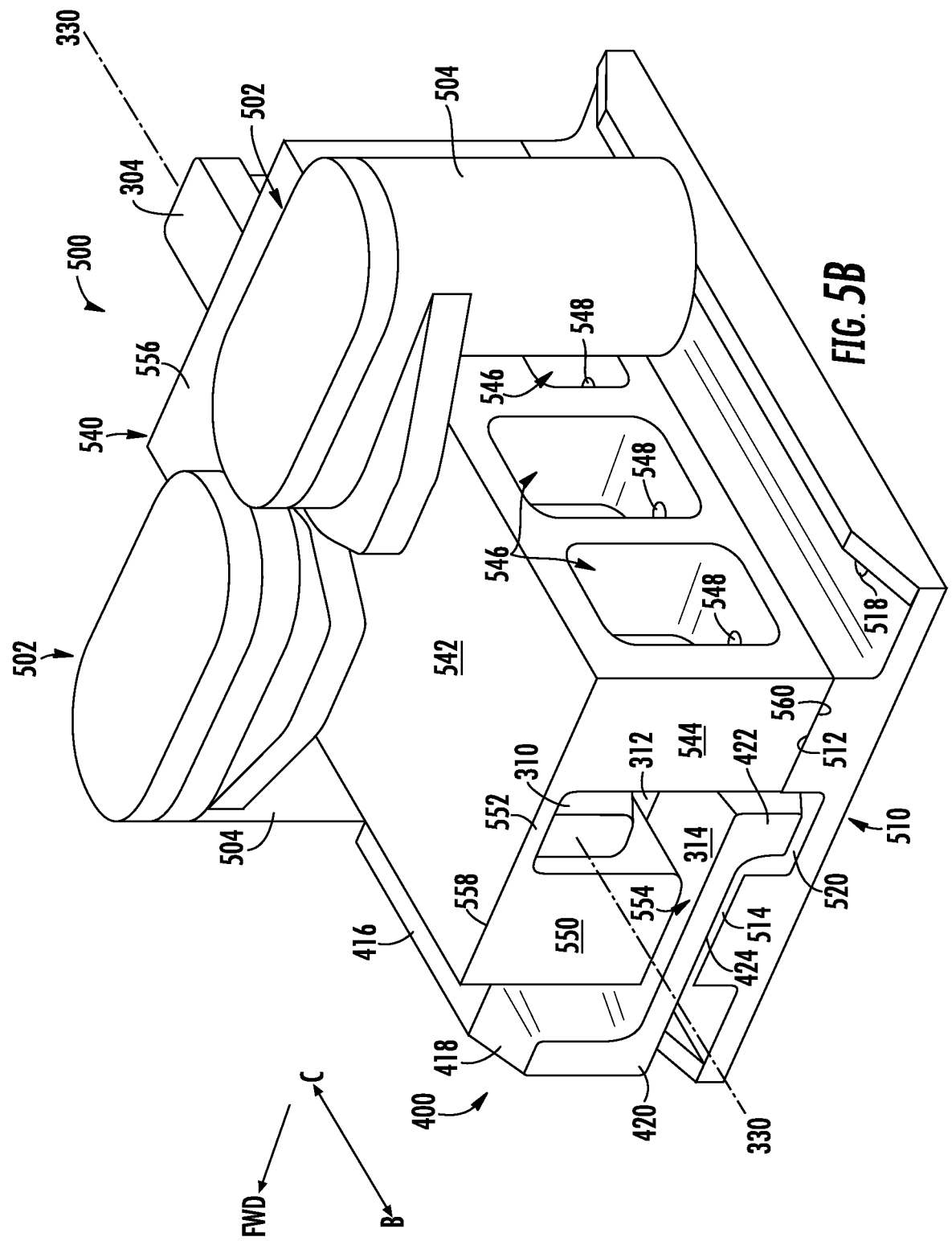

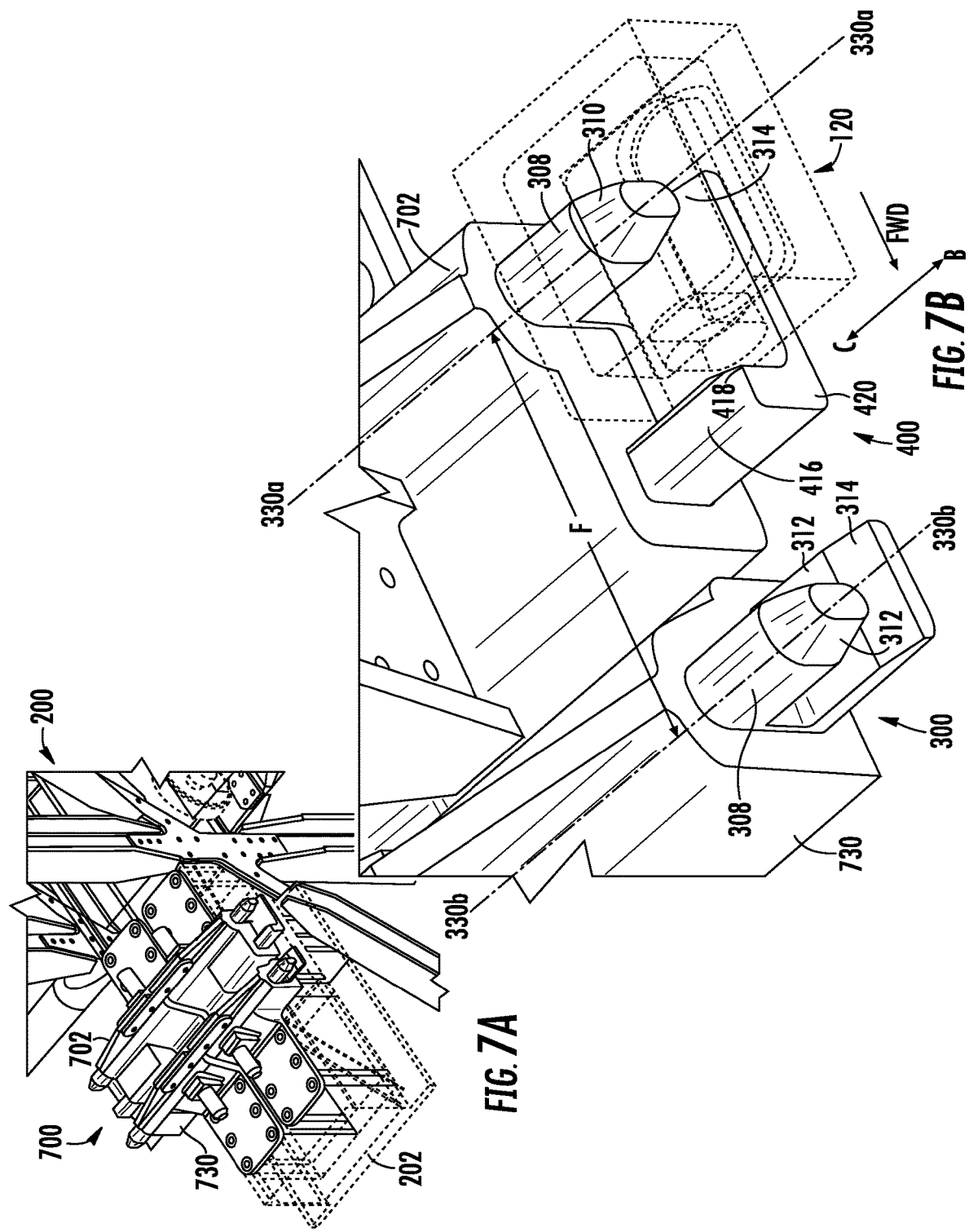

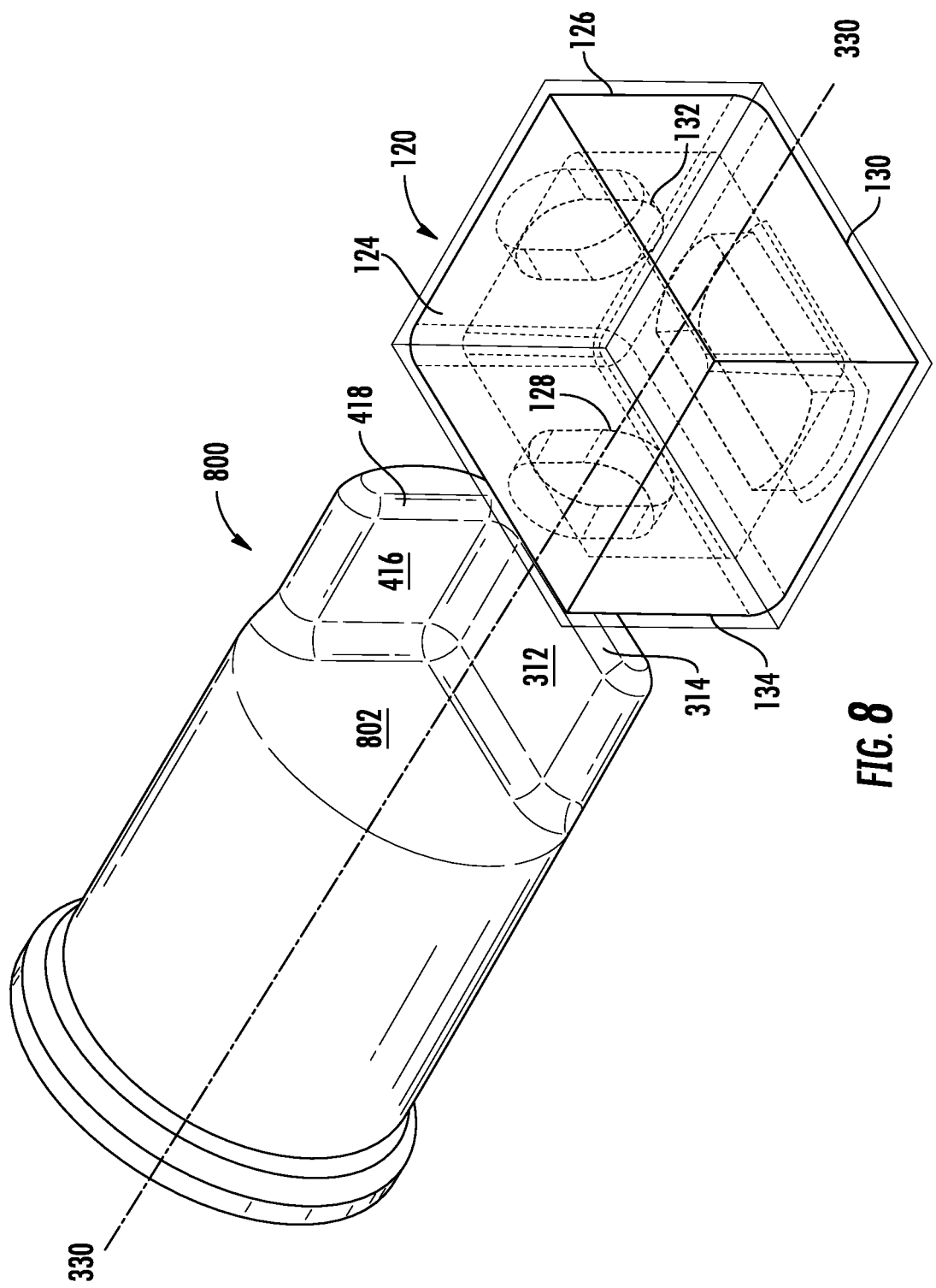

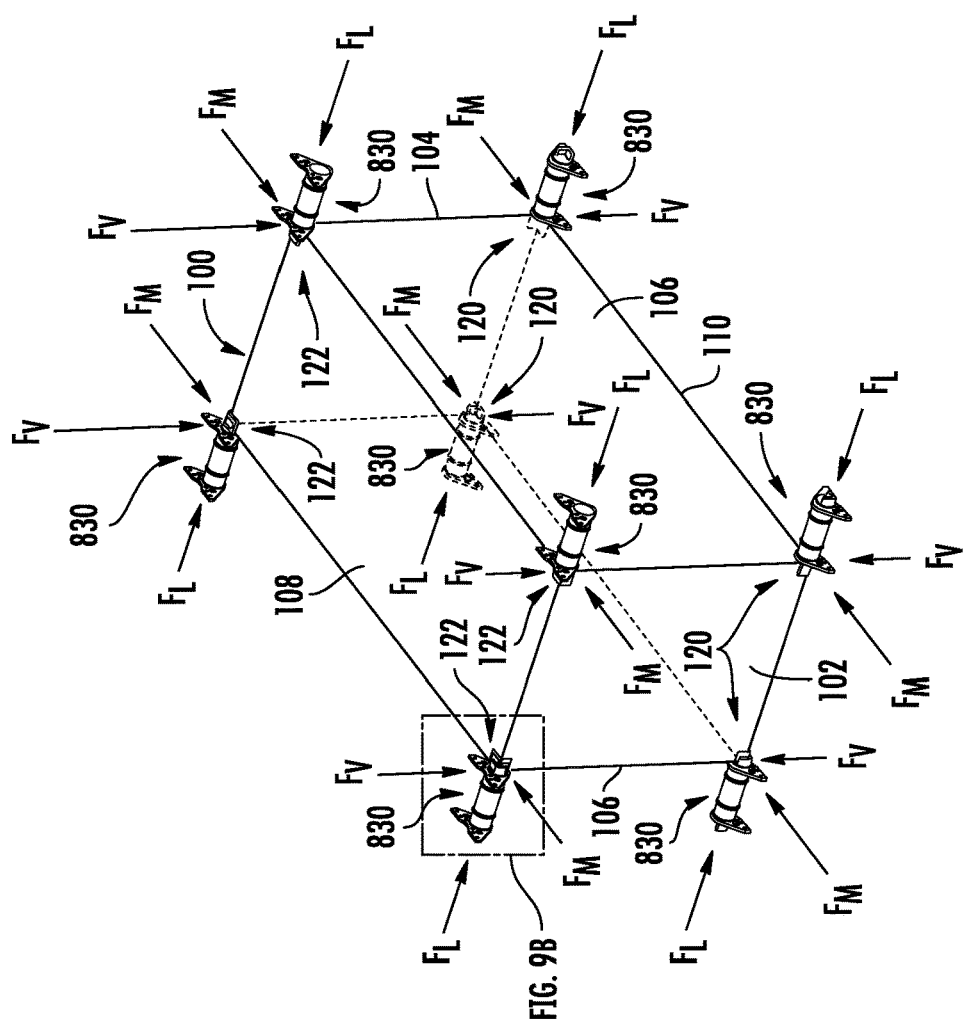
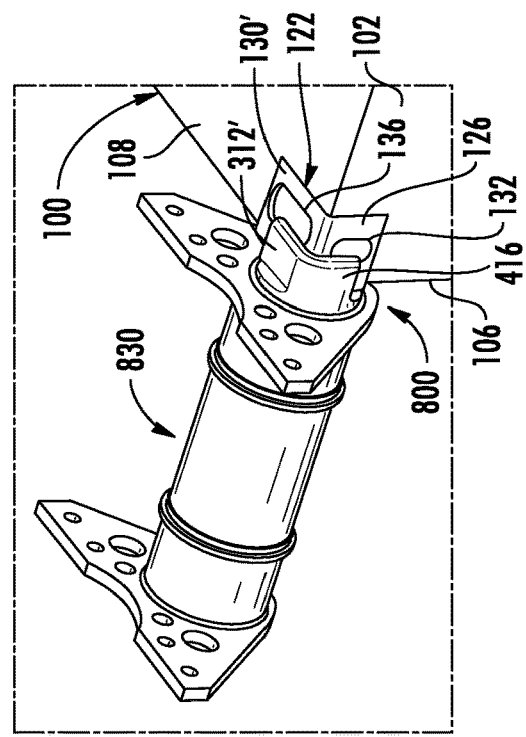
FIG. 9A
FIG. 9B

CARGO RESTRAINT SYSTEM

CROSS-REFERENCE TO RELATED APPLICATIONS

This application is a divisional of co-pending U.S. patent application Ser. No. 15/388,675, filed Dec. 22, 2016, and issued as U.S. Pat. No. 10,391,921, which is incorporated herein in its entirety.

BACKGROUND

Shipping containers, also called intermodal freight containers or intermodal cargo containers, are commonly used to move goods throughout the world. Such containers may have varying lengths (e.g., twenty feet or forty feet), but typically have identical widths (e.g., 8 feet (2.44 meters)) and identical heights (e.g., 8 feet, 6 inches (2.59 m)). The standardized widths and heights enable stacking of the containers for storage and/or for stowage aboard certain types of vehicles, such as container ships and/or trains. The containers also include a standardized anchoring system that enables the containers to be secured to each other and to many different types of vehicles, such as container ships, trains, and/or tractor-trailers. Recently, designs for aircraft and/or for frame structures within an aircraft that can carry such standardized shipping containers have been developed. U.S. Pat. No. 7,891,608, issued on Feb. 22, 2011, describes exemplary aircraft designs and/or frame structure designs, and is incorporated by reference herein in its entirety.

SUMMARY

According to one aspect, an apparatus comprises a housing configured for attachment to a frame of a vehicle. The apparatus also comprises a coupler reciprocally actuatable between a retracted position and an extended position. The coupler comprises a pin having a longitudinal axis. The pin is sized and oriented to enter an aperture in a sidewall of a corner fitting of an intermodal cargo container when the coupler is moved into the extended position. The coupler also comprises a bottom support in a fixed, spaced apart relationship relative to the pin, thereby defining a vertical gap sized to receive a bottom surface of the corner fitting when the coupler is moved into the extended position. The apparatus also comprises an actuator coupled to the housing and operable to move the coupler between the retracted position and the extended position along the longitudinal axis.

According to one aspect, a vehicle for transporting intermodal cargo containers with corner fittings is provided. The vehicle comprises a frame arranged in an interior volume of the vehicle. The frame includes first and second rails that are spaced apart to fit an intermodal cargo container therebetween. The vehicle comprises a first pin retention mechanism arranged on the first rail. The first pin retention mechanism comprises a first housing attached to the first rail. The first pin retention mechanism also comprises a first coupler reciprocally actuatable between a retracted position and an extended position. The first coupler comprises a first pin having a first longitudinal axis. The first pin is sized and oriented to enter an aperture in a sidewall of a first corner fitting of the intermodal cargo container when the first coupler is moved into the extended position. The first coupler also comprises a first bottom support in a fixed, spaced apart relationship relative to the first pin, thereby defining a first vertical gap sized to receive a bottom surface of the first corner fitting when the first coupler is moved into the extended position. The first pin retention mechanism also comprises a first actuator coupled to the first housing and operable to move the first coupler between the retracted position and the extended position along the first longitudinal axis. The vehicle also comprises a second pin retention mechanism arranged on the second rail. The second pin retention mechanism comprises a second housing attached to the second rail. The second pin retention mechanism also comprises a second coupler reciprocally actuatable between a retracted position and an extended position. The second coupler comprises a second pin having a second longitudinal axis. The second pin is sized and oriented to enter an aperture in a sidewall of a second corner fitting of an intermodal cargo container when the second coupler is moved into the extended position. The second coupler also comprises a second bottom support in a fixed, spaced apart relationship relative to the second pin, thereby defining a second vertical gap sized to receive a bottom surface of the second corner fitting when the second coupler is moved into the extended position. The second pin retention mechanism also comprises a second actuator coupled to the second housing and operable to move the second coupler between the retracted position and the extended position along the second longitudinal axis.

According to one aspect, a method for securing an intermodal cargo container is provided. The method comprises aligning an intermodal cargo container relative to first and second rails of a support frame. The first and second rails include respective first and second pin retention mechanism thereon. The first and second pin retention mechanisms comprise a first housing attached to a respective rail. The first and second pin retention mechanisms also comprise a first coupler reciprocally actuatable between a retracted position and an extended position. The first couplers comprise a first pin having a first longitudinal axis. The first pin is sized and oriented to enter an aperture in a sidewall of a corner fitting of the intermodal cargo container when the first coupler is moved into the extended position. The first couplers also comprise a first bottom support in a fixed, spaced apart relationship relative to the first pin, thereby defining a first vertical gap sized to receive a bottom surface of the corner fitting when the first coupler is moved into the extended position. The first and second pin retention mechanisms also comprise a first actuator coupled to the first housing and operable to move the first coupler between the retracted position and the extended position along the first longitudinal axis. The method also comprises actuating the actuators of the first and second pin retention mechanisms from the retracted position to the extended position such that the pins and bottom supports of the first and second pin retention mechanisms engage respective first and second corner fittings on opposite sides of the intermodal cargo container.

According to one aspect, a vehicle for transporting intermodal cargo containers with corner fittings is provided. The vehicle comprises a plurality of first pin retention mechanisms arranged to engage respective bottom corner fittings of the intermodal cargo container. The respective first pin retention mechanisms comprise a first housing attached to a frame. The respective first pin retention mechanisms also comprise a first coupler reciprocally actuatable between a retracted position and an extended position. The first coupler comprises a first surface in a facing relationship with a side-facing sidewall of a bottom corner fitting. The first surface engages the side-facing sidewall of the bottom corner fitting when the first coupler is moved into the extended position. The first coupler also comprises a bottom support protruding from the first surface along a first longitudinal axis. The bottom support receives a bottom surface of a bottom corner fitting when the first coupler is moved into the extended position. The first coupler also comprises a sidewall support protruding from the first surface along the longitudinal axis. The sidewall support receives an end-facing sidewall of the bottom corner fitting when the first coupler is moved into the extended position. The respective first pin retention mechanisms also comprise a first actuator coupled to the first housing and operable to move the first coupler between the retracted position and the extended position along the first longitudinal axis. The vehicle also comprises a plurality of second pin retention mechanisms arranged to engage top corner fittings of the intermodal cargo container. The respective second pin retention mechanisms comprise a second housing attached to the frame. The respective second pin retention mechanisms also comprise a second coupler reciprocally actuatable between a retracted position and an extended position. The second coupler comprises a second surface in a facing relationship with a side-facing sidewall of a top corner fitting. The second surface engages the side-facing sidewall of the top corner fitting when the second coupler is moved into the extended position. The second coupler also comprises a top support protruding from the second surface along a second longitudinal axis. The top support receives a top surface of a top corner fitting when the second coupler is moved into the extended position. The second coupler also comprises a sidewall support protruding from the second surface along the second longitudinal axis. The sidewall support receives an end-facing sidewall of the top corner fitting when the second coupler is moved into the extended position. The respective second pin retention mechanisms also comprise a second actuator coupled to the second housing and operable to move the second coupler between the retracted position and the extended position along the second longitudinal axis.

BRIEF DESCRIPTION OF ILLUSTRATIONS

FIG. 1A is a perspective view of an intermodal freight container;

FIG. 1B is a detail top perspective view of a bottom corner fitting of the intermodal freight container of FIG. 1A;

FIG. 1C is a detail bottom perspective view of the bottom corner fitting of FIG. 1B;

FIG. 3A is a perspective view of a coupler for a pin retention mechanism according to one aspect;

FIG. 3B is a perspective cross-sectional view of the coupler of FIG. 3A engaged with a corner fitting of an intermodal freight container;

FIG. 5B is a perspective view of an assembled housing and actuator for moving the coupler illustrated in FIGS. 4A and 4B, wherein the coupler is illustrated in a retracted position;

FIG. 7A is a perspective view of two pin retention mechanisms arranged along a rail of a frame;

FIG. 7B is a detail perspective view of the couplers of the pin retention mechanisms of FIG. 7A;

FIG. 8 is a perspective view of another coupler, according to another aspect, in alignment with a corner fitting;

FIG. 9A is a perspective view of the intermodal shipping container of FIG. 1A with couplers of FIG. 8 disposed at the eight corners of the intermodal shipping container and engaged with the corner fittings of the intermodal shipping container; and FIG. 9B is a detail perspective view of a corner fitting of the shipping container and coupler engaged with the corner fitting.

DETAILED DESCRIPTION

Figure 2A:
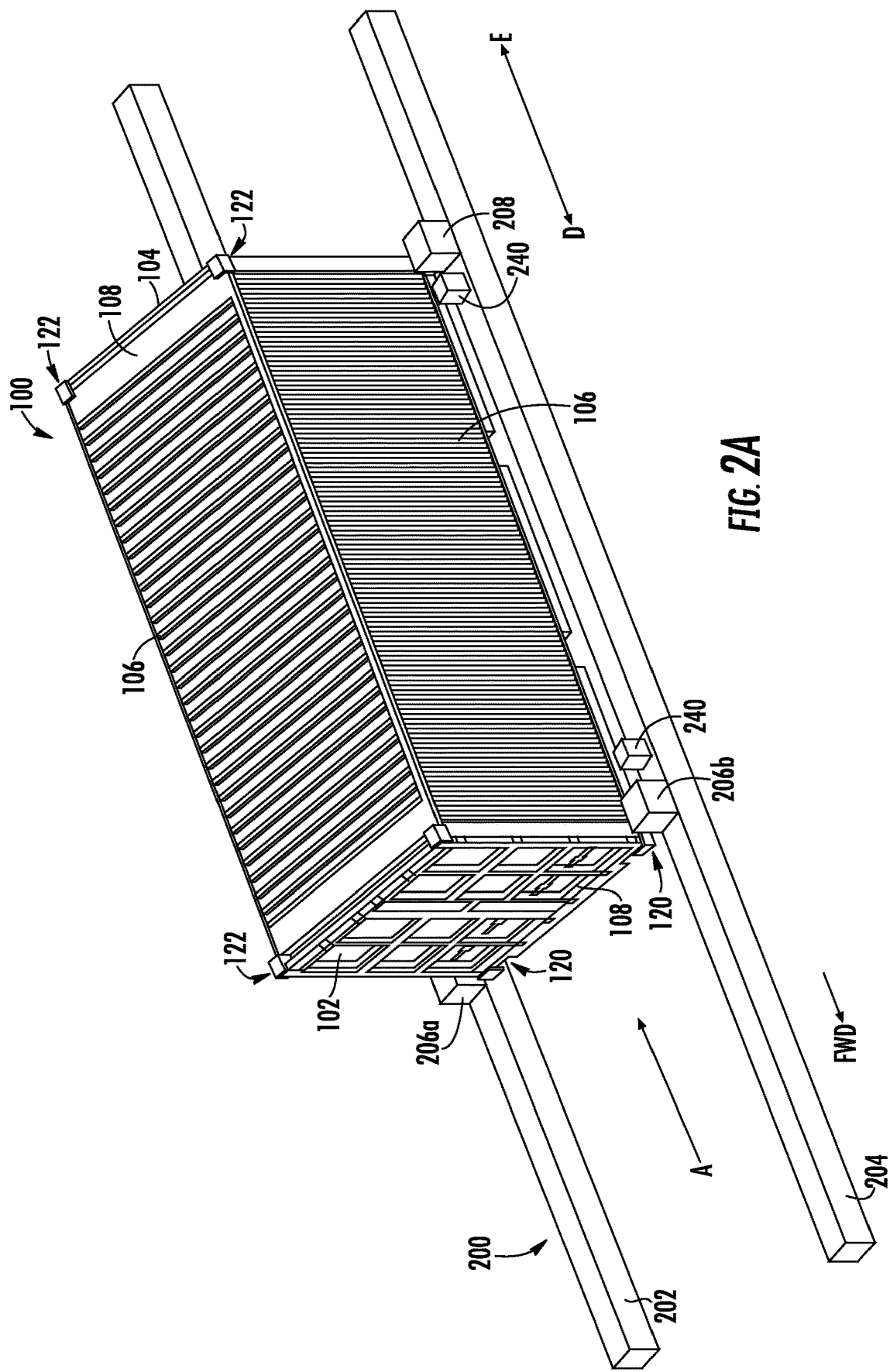
FIG. 2A is a perspective view of the intermodal freight container of FIG. 1A arranged between rails (i.e., frame members) of a frame according to one aspect, wherein pin retention mechanisms are arranged along the rails proximate to the corner fittings of the intermodal freight container.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In aspects described herein, pin retention mechanisms are described that enable an intermodal cargo container (or other types of cargo container) to be quickly connected to or disconnected from a vehicle frame using existing corner fittings of the intermodal cargo container. The pin retention mechanisms include couplers that support the corner fittings at multiple locations to distribute forces caused by high acceleration loads that may be experienced onboard the vehicle and/or that the vehicle is certified to experience.

FIG. 1A is a perspective view of an intermodal cargo container 100 that includes a first end 102, a second end 104, sides 106, a top 108, and a bottom 110. The first end 102 and/or the second end 104 include doors that enable access to an interior volume of the intermodal cargo container 100. As discussed above, the height of the first end 102, the second end 104, and the sides 106 is typically standardized. Also, the widths of the first end 102 and second end 104 is also typically standardized. As a result, a plurality of such intermodal cargo containers 100 can be stacked side-by-side and/or on top of one another in an organized, space-efficient manner. The lengths of the sides 106 can vary from container to container, but typically fall within one of several standard lengths, such as 20 feet or 40 feet. As used herein, the terms "front end" and "back end" are relative to a direction of travel of the intermodal cargo container 100 aboard a vehicle. For example, FIG. 1A includes an arrow ("FWD") indicating a forward direction such that the first end 102 is the front end. In various circumstances, the intermodal cargo container 100 could be arranged on a vehicle such that the second end 104 is facing the forward direction, in which case the second end 104 would be the front end and the first end 102 would be the back end.

The intermodal cargo container 100 includes corner fittings arranged at its corners. The intermodal cargo container 100 includes four bottom corner fittings 120 arranged at corners with the bottom 110 of the intermodal cargo container 100. The intermodal cargo container 100 also includes four top corner fittings 122 arranged at corners with the top 108 of the intermodal cargo container. When one intermodal cargo container 100 is stacked on top of a second intermodal cargo container 100, the top corner fittings 122 of the bottom intermodal cargo container 100 are connected to the bottom corner fittings 120 of the top intermodal cargo container 100 using twist lock connectors or other connectors. In the aspects described herein, the pin retention mechanisms that connect the intermodal cargo container 100 to a frame of a vehicle, engage the bottom corner fittings 120 of the intermodal cargo container 100.

FIGS. 1B and 1C are top and bottom perspective views of a bottom corner fitting 120, respectively, of the intermodal cargo container 100. The bottom corner fitting 120 is generally arranged as a hollow cube that includes a top surface 124 attached to the bottom 110 of the intermodal cargo container 100. Alternatively, the top surface 124 of the bottom corner fitting 120 could be part of the bottom 110 of the intermodal cargo container 100. The bottom corner fitting 120 also includes sidewalls 126 and 128 that are arranged 90° with respect to one another. For a bottom corner fitting 120 positioned at the first end 102 of the intermodal cargo container 100, the sidewall 126 generally faces the first end 102 of the intermodal cargo container 100 and the sidewall 128 generally faces the side 106 of the intermodal cargo container 100. For a bottom corner fitting 120 positioned at the second end 104 of the intermodal container 100, the sidewall 126 generally faces the second end 104 of the intermodal container 100 and the sidewall 128 generally faces the side 106 of the intermodal container 100. The sidewalls 126 and 128 include apertures 132 and 134, respectively, therethrough. The apertures 132 and 134 have an oval shape designed to receive a connector, such as a twist lock, which are commonly used to secure the intermodal cargo container 100 to adjacent intermodal cargo containers, to a frame of a tractor-trailer, or to a frame of a train car, for example. The apertures 132 and 134 could receive connectors attached to tension bars that strap adjacent intermodal cargo containers 100 together. The bottom corner fitting 120 also includes a bottom surface 130. The bottom surface 130 includes an aperture 136 therethrough.

The aperture 136 of the bottom surface 130 also has a shape designed to receive a connector, such as a twist lock, to secure the intermodal cargo container 100 to adjacent intermodal cargo containers 100, to a frame of a tractor-trailer, or to a frame of a train car.

In many applications, such as travel aboard a ship and/or travel aboard a train, the intermodal cargo container 100 does not experience significant acceleration loads (including deceleration loads). In other modes of travel however (e.g., travel aboard an aircraft) the intermodal cargo container 100 may be subject to higher loads. Furthermore, design standards may require that connections between the intermodal cargo container 100 and a vehicle frame be capable of withstanding certain acceleration loads. For example, in certain aviation applications, the corner fittings 120 of the intermodal cargo container 100 must be able to withstand in 9 G load in the forward direction (i.e., loading due to sudden deceleration during a crash event, for example), a 6 G load in a downward direction (i.e., loading due to a rapid increase in pitch attitude, for example), and a 1.5 G load in an upward direction (i.e., loading due to a rapid decrease in pitch attitude, for example). In such aviation applications, the corner fittings 120 may not be subject to load requirements in an aft direction and only small lateral load requirements. The corner fittings 120 are typically not designed to withstand the high loads of the design requirements for the aviation applications. As a result, if the intermodal cargo container 100 is connected to a vehicle frame solely with pins extending through the apertures 134 in the sidewalls 128 of the corner fittings 120, the sidewalls 128 may yield (i.e., the pins may tear through the sidewalls 128) during such high acceleration loads such that the corner fitting 120 breaks free from the vehicle frame.

Figure 2B:
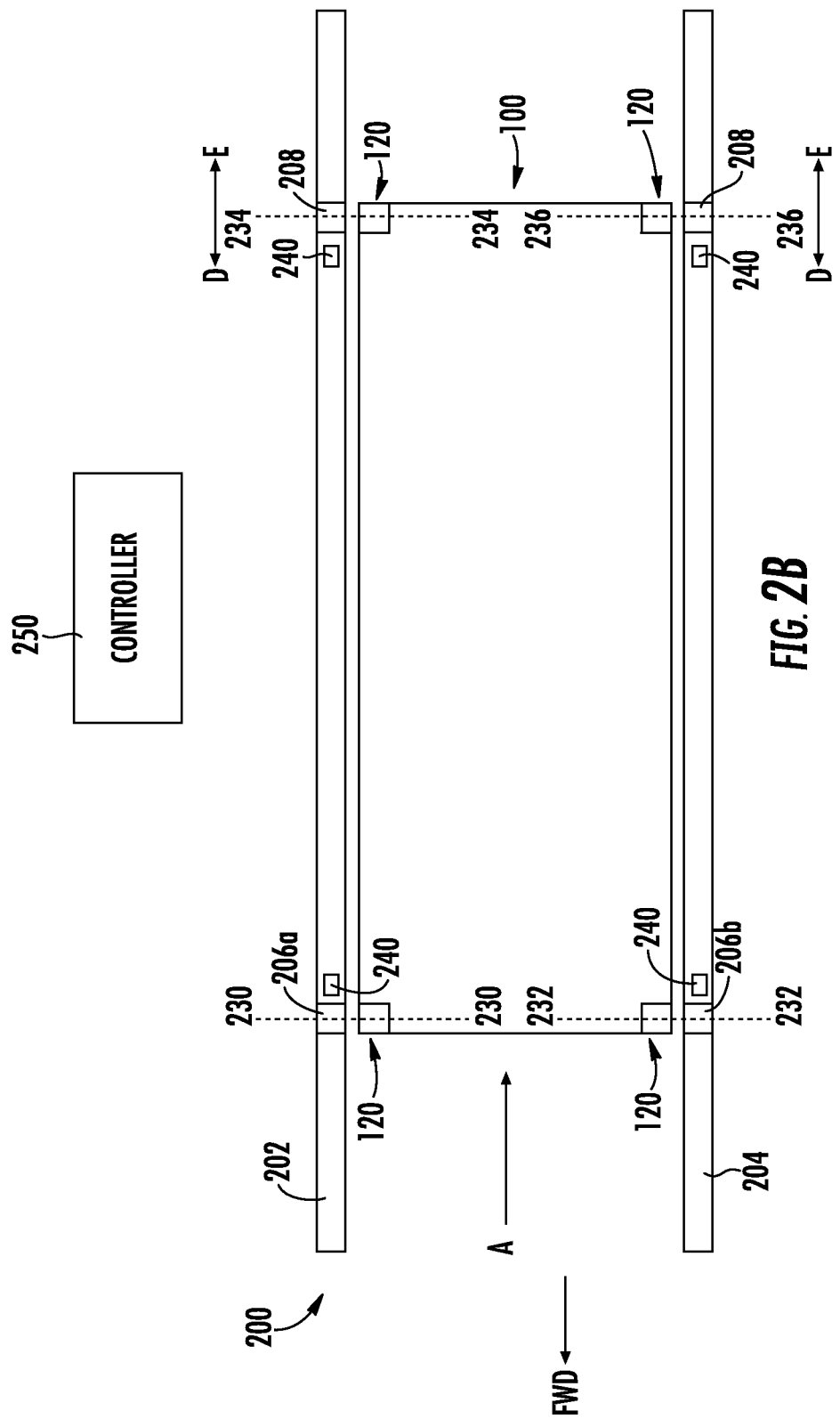
FIG. 2B is a top view of the intermodal freight container of FIG. 1A arranged between the rails of the frame, wherein the pin retention mechanisms are arranged along the rails proximate to the corner fittings of the intermodal freight container.
Figure 2C:
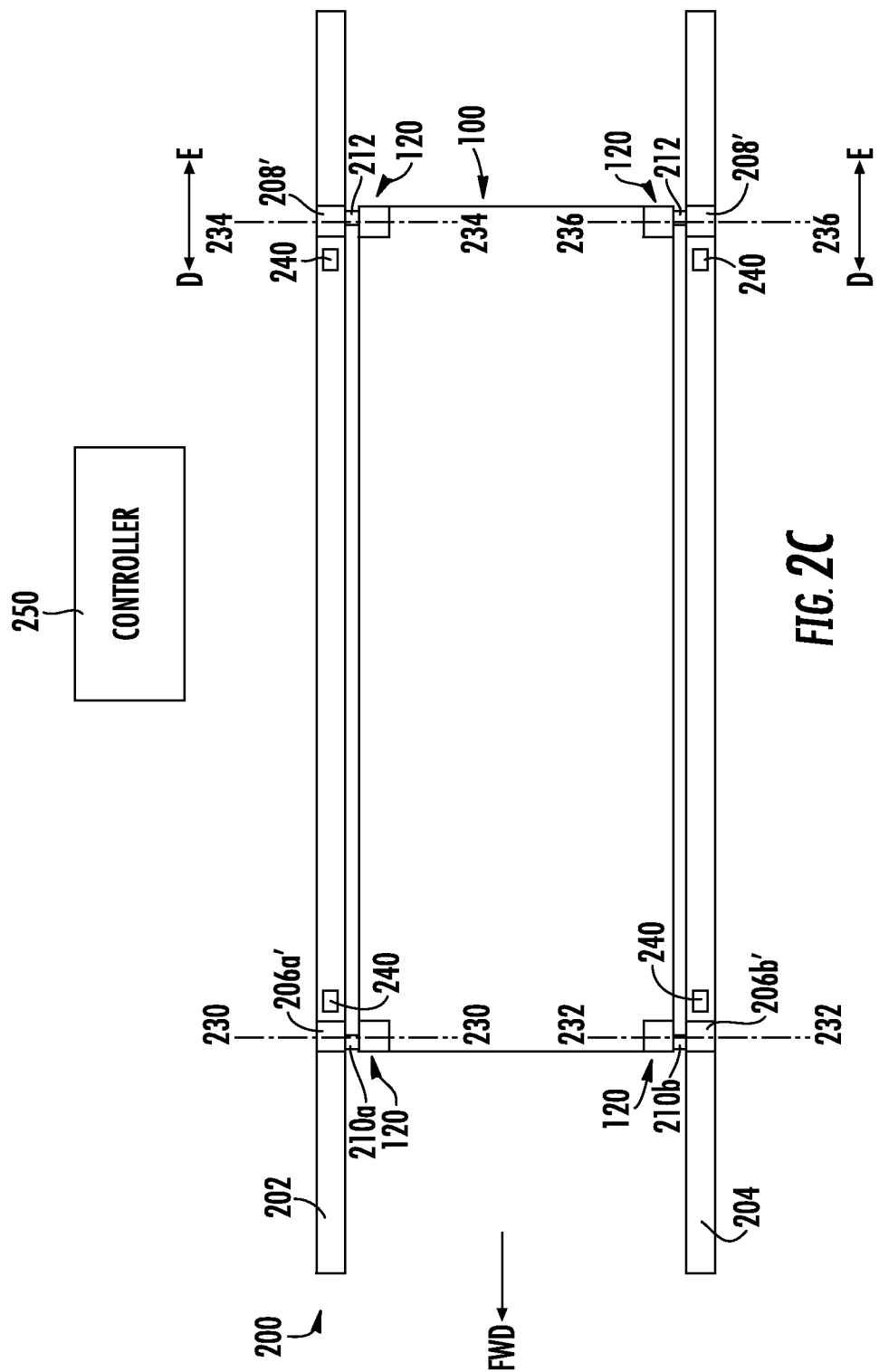
FIG. 2C is a top view of the intermodal freight container of FIG. 1A, wherein couplers of the pin retention mechanisms have moved to an extended position to engage the corner fittings of the intermodal freight container.

FIG. 2A is a perspective view of the intermodal cargo container 100 arranged between a first rail 202 and a second rail 204 of a frame 200 for a vehicle. FIGS. 2B and 2C are top views of the intermodal cargo container 100, the first rail 202, and the second rail 204. The rails 202 and 204 include pin retention mechanisms 206a, 206b, and 208 arranged thereon. In certain aspects, pin retention mechanisms 206a and 206b may include side-specific couplers. Specifically, in addition to bottom supports that engage the bottom surfaces 130 of the bottom corner fittings 120, the pin retention mechanisms 206a and 206b may include sidewall supports that engage the forward-facing sidewalls 126 of the respective bottom corner fittings 120. In various other aspects, the pin retention mechanisms 206a and 206b may not include such sidewall supports and are identical.

Referring primarily to FIGS. 2B and 2C, each of the pin retention mechanisms 206a, 206b, and 208 is arranged relative to a longitudinal axis. For example, as illustrated in FIGS. 2B and 2C, the pin retention mechanism 206a is aligned with a first axis 230, the pin retention mechanism 206b is aligned with a second axis 232, and the pin retention mechanisms 208 are aligned with a third axis 234, and axis 236, respectively. In various aspects, certain ones of the axes 230, 232, 234, and 236 may be co-linear. For example, as illustrated in FIGS. 2B and 2C, the first axis 230 and the second axis 232 are co-linear and the third axis 234 and the fourth axis 236 are co-linear.

The couplers of the pin retention mechanisms 206a, 206b, and 208 are moved from retracted positions to extended positions along the respective axes by actuators to engage the bottom corner fittings 120 of the intermodal cargo container 100. For example, FIG. 2C illustrates a first coupler 210a extended from the pin retention mechanism 206a' to engage a forward bottom corner fitting 120 of the intermodal cargo container 100. FIG. 2C also illustrates a second coupler 210b extended from the pin retention mechanism 206b' to engage a forward bottom corner fitting 120 of the intermodal cargo container 100. FIG. 2C also illustrates third and fourth couplers 212 extended from the pin retention mechanisms 208' to engage the aft bottom corner fittings 120 of the intermodal cargo container 100.

FIG. 3A is a perspective view of an exemplary coupler 300 for a pin retention mechanism (e.g., one of the pin retention mechanisms 206 or 208 discussed above with reference to FIGS. 2A-2C), according to one aspect. The coupler 300 includes a base 302. In certain aspects, the base 302 may include fastener holes or fastener slots 303 configured to receive fasteners (e.g., bolts) to connect the coupler 300 an actuator to move the coupler 300 between a retracted position and an extended position. The coupler 300 also includes a shank 304 extending from the base 302. The shank 304 includes a face 306. A pin 308 having a longitudinal axis extends from the face 306. The base 302 and the shank 304 can be aligned along the longitudinal axis 330. The longitudinal axis 330 could be the same as or could be parallel to one of the above-described axes of the pin retention mechanisms 206a, 206b, and/or 208 in FIGS. 2B and 2C. The pin 308 includes a cross-sectional profile similar to that of the aperture 134 of the sidewall 128 of the bottom corner fitting 120. The exemplary aperture 134 in the bottom corner fitting 120 has an oval profile, and the exemplary pin 308 also includes an oval profile. In at least one aspect, the pin 308 has slightly smaller dimensions than the aperture 134. In this aspect, a portion of the base 302 extends along the longitudinal axis 330 past the face 306 to form a bottom support 312. The bottom support is spaced apart from the pin 308 by a vertical gap $G_1$. The pin 308 optionally includes a chamfered edge 310, and the bottom support 312 optionally includes a chamfered edge 314 along a pin-facing surface of the bottom support 312.

FIG. 3B is a perspective, cross-sectional view of the coupler 300 after it is moved to an extended position along the longitudinal axis 330 (indicated by arrow B) such that the coupler 300 is engaged with a bottom corner fitting 120. The pin 308 of the coupler 300 is inserted through the aperture 134 in the sidewall 128 of the bottom corner fitting 120. The bottom support 312 of the coupler 300 is in a fixed, spaced apart relationship with the pin 308 such that a pin-facing surface 313 of the bottom support 312 abuts the bottom surface 130 of the bottom corner fitting 120 when the pin 308 is inserted into the aperture 134. The optional chamfered edge 310 on the pin 308 and the optional chamfered edge 314 of the bottom support 312 can aid in alignment between the coupler 300 and the bottom corner fitting 120. For example, if the coupler 300 is slightly high (relative to ideal alignment) with the bottom corner fitting 120, then the optional chamfered edge 310 on the pin 308 and the optional chamfered edge 314 of the bottom support 312 can make contact with the aperture 134 and the bottom surface 130 of the bottom corner fitting 120 and thereby urge the coupler 300 into alignment with the bottom corner fitting 120 and/or urge the bottom corner fitting 120 into alignment with the coupler 300.

The coupler 300 illustrated in FIGS. 3A and 3B provides support to the bottom corner fitting 120 through the engagement of the pin 308 with the aperture 134 of the corner fitting 120 in both a vertical direction and forward/aft directions (i.e., directions normal to the longitudinal axis 330). However, as discussed above, the support provided by the engagement of the pin 308 with the aperture 134 may be insufficient to support the intermodal cargo container 100 during certain high-acceleration events. The bottom support 312 of the coupler 300 provides additional support for the corner fitting 120 in the vertical direction such that the total support provided by the pin 308 and the bottom support 312 is sufficient to support the intermodal cargo container 100 during certain high-acceleration events in a vertical direction (e.g., a 6 G downward load requirement). In circumstances in which the vehicle carrying the intermodal cargo container 100 is only expected to encounter high-acceleration events in the vertical direction, the coupler 300 could be used in all four of the pin retention mechanisms 206a, 206b, and 208 illustrated in FIGS. 2A-2C.

Figure 4A:
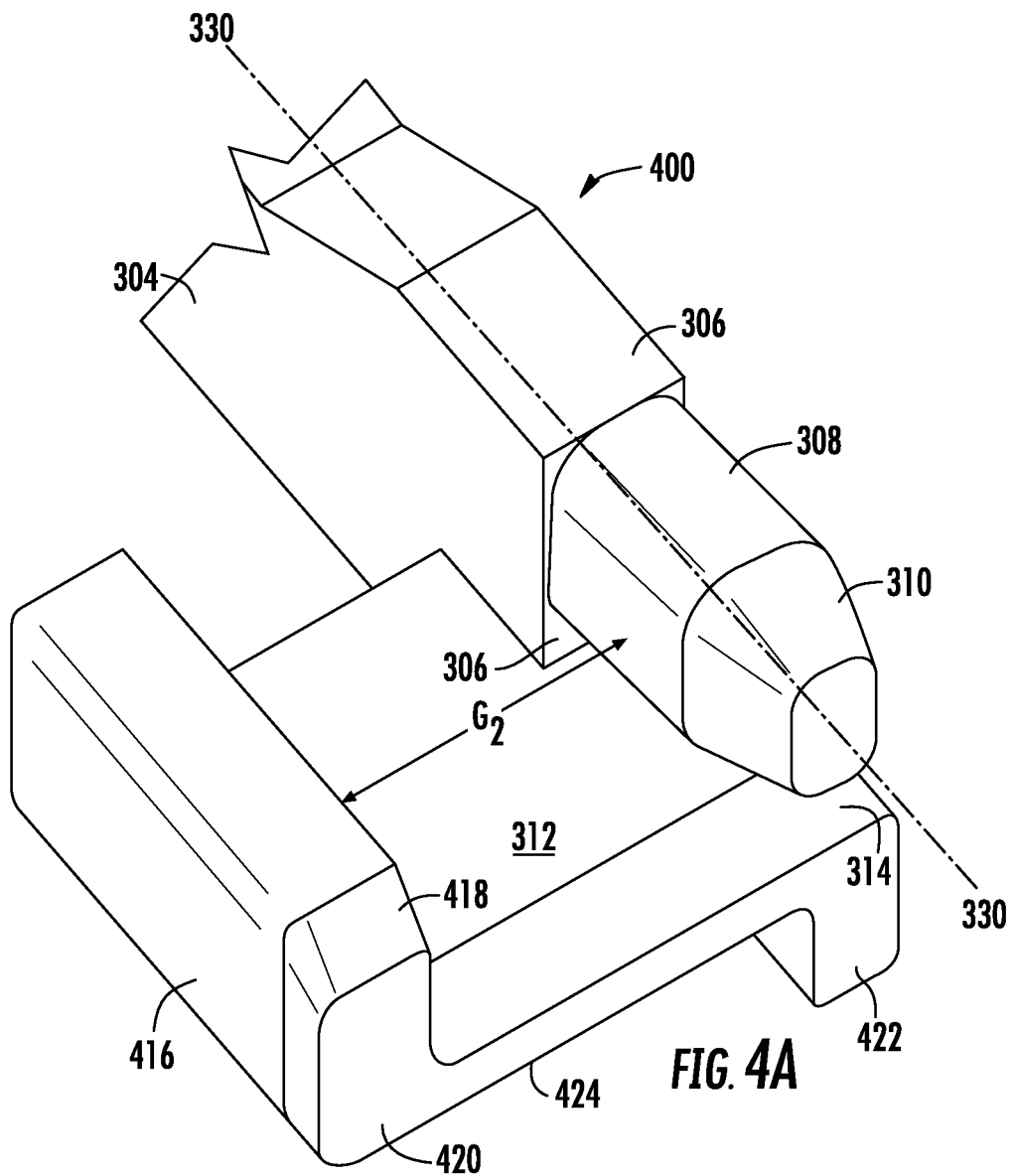
FIG. 4A is a perspective view of another coupler for a pin retention mechanism according to one aspect.

FIG. 4A is a perspective view of a portion of an exemplary coupler 400 according to one aspect that provides additional support to the bottom surface 130 of the bottom corner fitting 120 and to a forward facing sidewall 126 of the bottom corner fitting 120. The coupler 400 includes a shank 304. In certain aspects, the shank 304 includes the face 306. The shank 304 and the face 306 are arranged along a longitudinal axis 330. The longitudinal axis 330 could be the same as or could be parallel to one of the above-described axes of the pin retention mechanisms 206a, 206b, and/or 208 in FIGS. 2B and 2C.

The coupler 400 includes a pin 308 having a longitudinal axis 330 extending from the face 306. In at least one aspect, the pin 308 includes a chamfered edge 310. The coupler 400 also includes a bottom support 312 extending from the coupler portion 306 of the shank 304 along the longitudinal axis 330. The bottom support 312 includes a first chamfered edge 314 along a pin-facing surface of the bottom support 312. The coupler 400 also includes a sidewall support 416 extending along the longitudinal axis 330 and spaced apart from the pin 308 by a lateral gap $G_2$. In at least one aspect, the sidewall support 416 includes a second chamfered edge 418 along a pin facing surface of the sidewall support 416. The sidewall support 416 is arranged at an angle relative to the bottom support 312 about the longitudinal axis 330. In the aspect shown in FIG. 4A, the sidewall support 416 is arranged at a 90° angle relative to the bottom support 312. In the aspect shown in FIG. 4A, the sidewall support 416 and the bottom support 312 are joined at intersecting edges 420. In at least one aspect, the bottom support 312 and the sidewall 416 are unitary monolithic. For example, the coupler 400 could be machined from a block of steel, titanium, or other metal to form, e.g., the pin 308, the bottom support 312 and the sidewall support 416. In at least one aspect, the coupler 400 optionally includes a keyway protrusion 422 extending from a surface of the bottom support 312 and/or the shank 304 opposite the pin facing surface of the bottom support 312. As shown primarily in FIGS. 5B and 5C, the keyway protrusion 422 can engage a keyway that directs movement of the coupler 400 along the longitudinal axis 330.

Figure 4B:
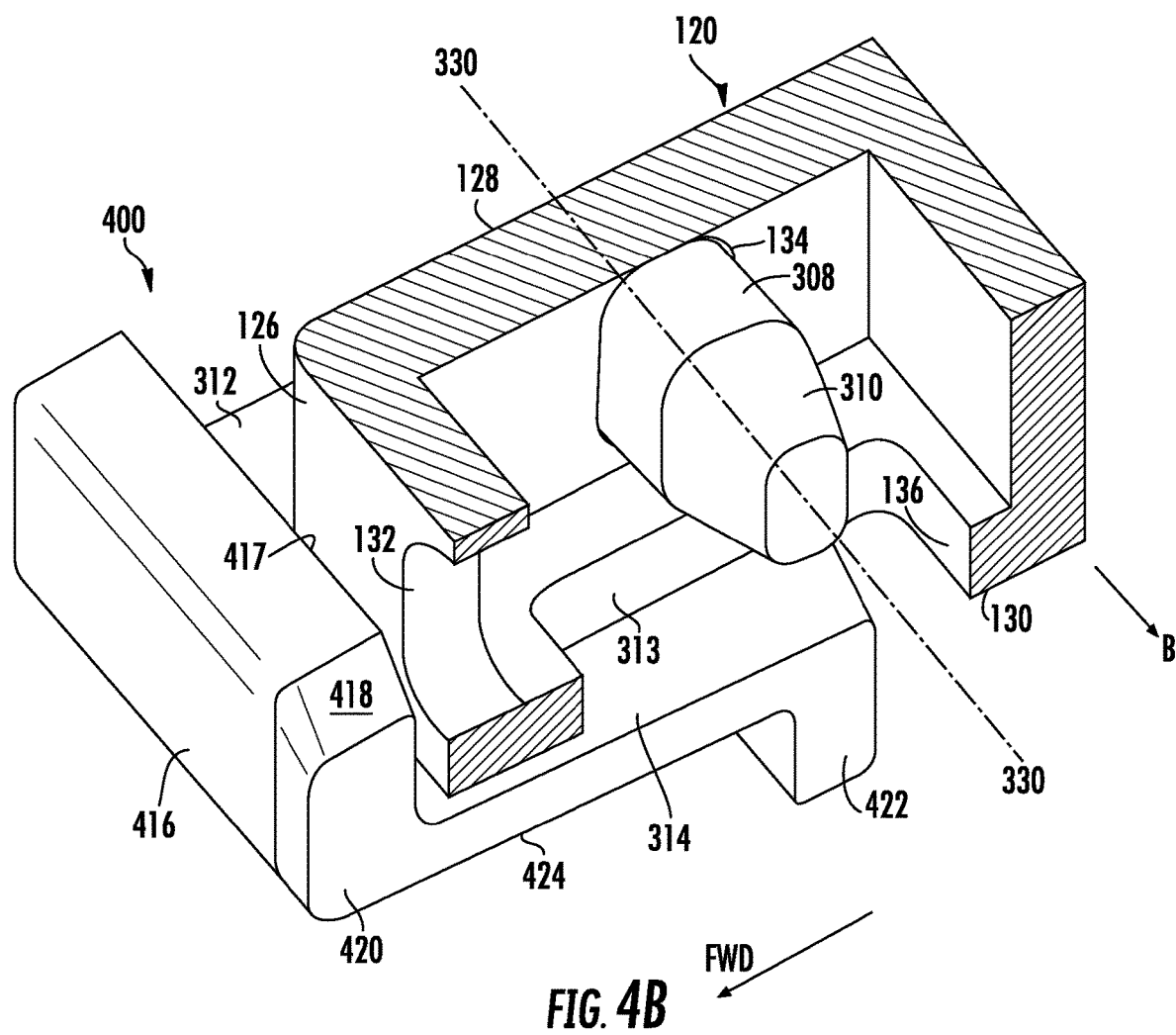
FIG. 4B is a perspective view of the coupler of FIG. 4A engaged with a corner fitting of an intermodal freight container, wherein the corner fitting is shown in partial section.

FIG. 4B is a perspective view of a portion of the coupler 400 engaged with a bottom corner fitting 120 of an intermodal cargo container 100, wherein the bottom corner fitting 120 is illustrated in cross-section for clarity. The pin 308 of the coupler 400 is inserted through the aperture 134 in the sidewall 128 of the bottom corner fitting 120. The pin 308 includes a cross-sectional profile similar to that of the aperture 134 of the sidewall 128 of the bottom corner fitting 120. The exemplary aperture 134 in the bottom corner fitting 120 has an oval profile, and the exemplary pin 308 also includes an oval profile. In at least one aspect, the pin 308 has slightly smaller dimensions than the aperture 134. The bottom support 312 of the coupler is in a fixed, spaced apart relationship with the pin 308 such that a pin-facing surface 313 of the bottom support 312 abuts the bottom surface 130 of the bottom corner fitting 120 when the pin 308 is inserted through the aperture 134 of the sidewall 128. The sidewall support 416 of the coupler 400 is spaced apart from the pin 308 such that a pin-facing surface 417 of the sidewall support 416 abuts the forward-facing sidewall 126 of the bottom corner fitting 120 when the pin 308 is inserted through the aperture 128 of the sidewall 134.

The coupler 400 illustrated in FIGS. 4A and 4B provides support to the bottom corner fitting 120 through the engagement of the pin 308 with the aperture 134 of the corner fitting 120 in both a vertical direction and forward directions (i.e., directions normal to the longitudinal axis 330). However, as discussed above, the support provided by the engagement of the pin 308 with the aperture 134 may be insufficient to support the intermodal cargo container 100 during certain high acceleration events. The bottom support 312 of the coupler 400 provides additional support for the corner fitting 120 in the vertical direction such that the total support provided by the pin 308 and the bottom support 312 is sufficient to support the intermodal cargo container 100 during certain high acceleration events in a vertical direction (e.g., a 6 G downward load requirement). The sidewall support 416 of the coupler 400 provides additional support in the forward direction such that the total support provided by the pin 308 and the sidewall support 416 is sufficient to support the corner fitting 120 of the intermodal cargo container 100 during certain high acceleration events in a forward direction (i.e., during hard braking or during a crash event).

Figure 5A:
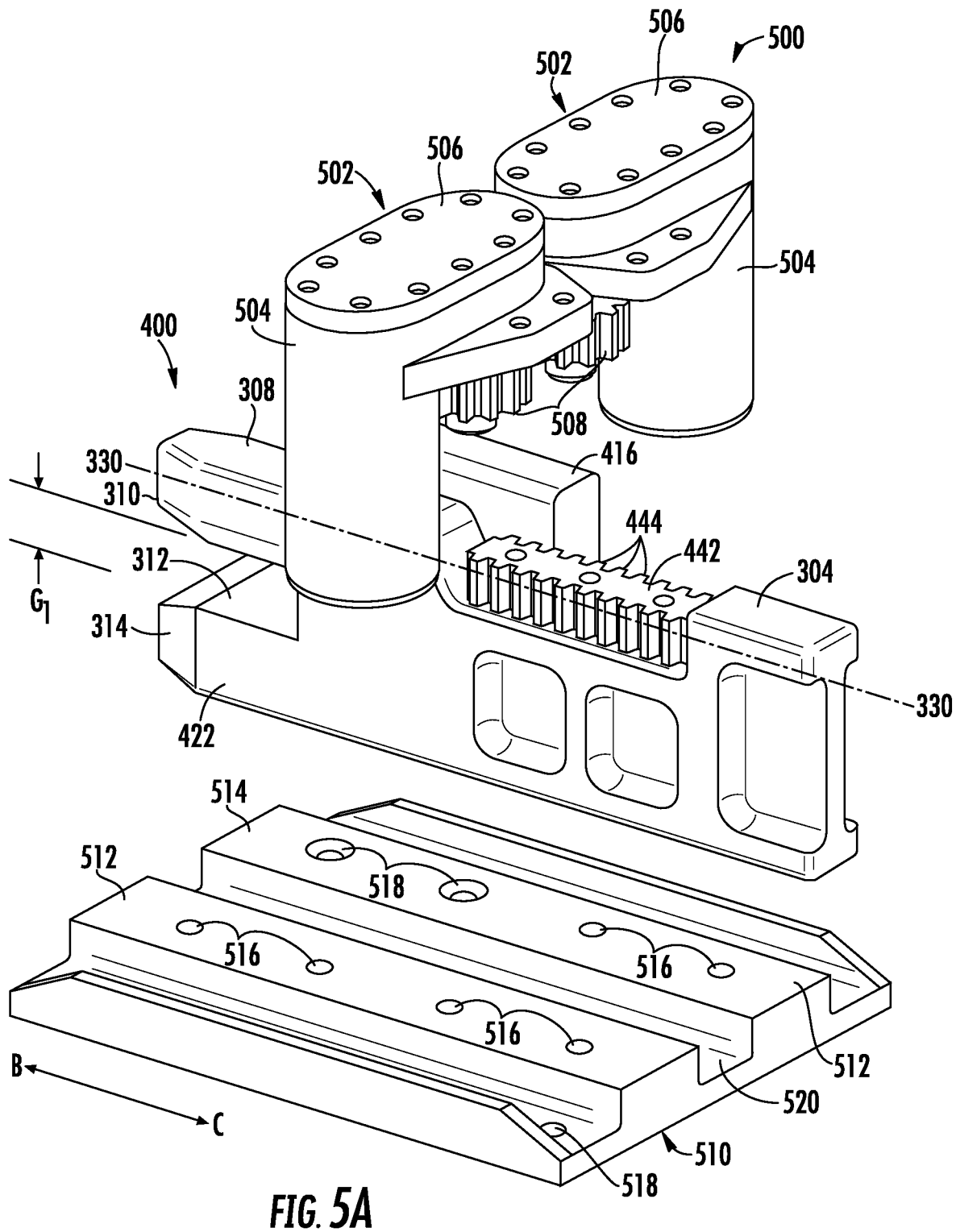
FIG. 5A is an exploded perspective view of a portion of a housing and an actuator for moving a coupler.
Figure 5C:
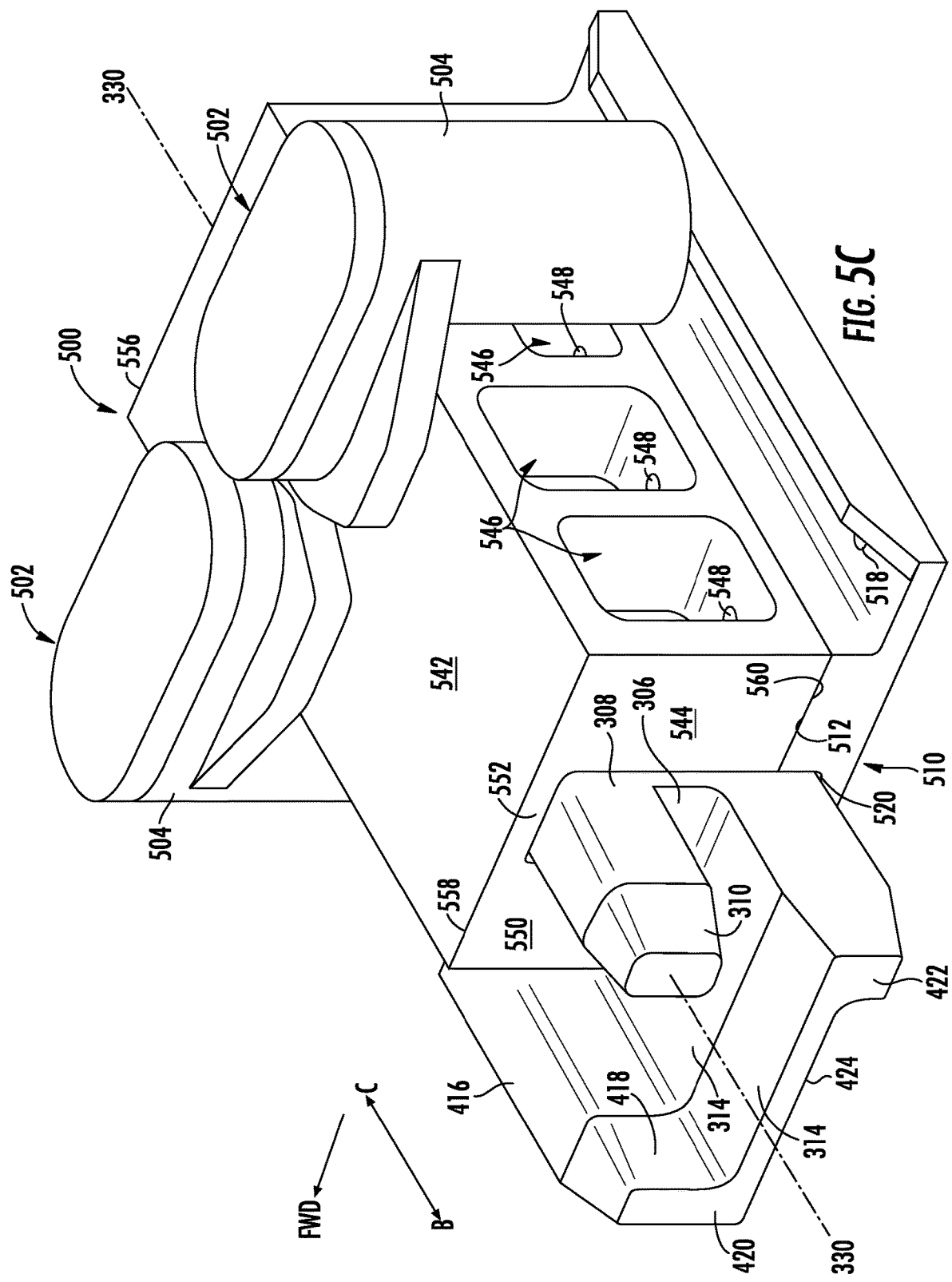
FIG. 5C is a perspective view of the assembled housing and actuator for moving the coupler of FIG. 5B, wherein the coupler is illustrated in an extended position.

FIGS. 5A-5C illustrate a pin retention mechanism 500 according to one aspect. FIGS. 5A-5C are illustrated with the coupler 400 of FIGS. 4A and 4B. However, the pin retention mechanism 500 could also be configured with the coupler 300, illustrated in FIGS. 3A and 3B. FIG. 5A is an exploded perspective view of a pin retention mechanism 500, in which a housing is not shown for clarity. The pin retention mechanism 500 includes the coupler 400 arranged in a sliding relationship with a mounting plate 510. The mounting plate 510 includes a keyway 520 that engages the optional keyway protrusion 422. The mounting plate 510 includes mounting surfaces 512 upon which an upper housing (shown in FIGS. 5B and 5C) is mounted. The housing can be secured to the mounting surfaces 512 on the mounting plate 510 with fasteners (e.g., bolts).

The mounting plate 510 also includes a coupler surface 514 that can support at least portions of the bottom support 312 of the coupler, such that the bottom support 312 can slide relative to the coupler surface 514. In one aspect, the coupler surface 514 could include a lubrication layer (e.g., grease) to support such sliding of the bottom support 312. In another aspect, the coupler surface 514 could include a low-friction layer (e.g., a nylon plastic) arranged thereon to support such sliding of the bottom support 312 over the coupler surface 514.

The mounting plate 510 includes a plurality of fastener holes 518 that can receive fasteners (e.g., bolts or rivets) to attach the mounting plate 510 to the rail 202 or the rail 204 of the vehicle frame 200. The mounting plate 510 also includes a plurality of fastener holes 516 configured to receive fasteners to secure the top part of the housing to the mounting plate 510.

The shank 304 of the coupler 400 includes a cog rack 442 arranged thereon. The cog rack 442 includes teeth 444 arranged in a linear manner along the longitudinal axis 330. The pin retention mechanism 500 includes at least one motor assembly 502 that uses a motor 504 to drive a pinion gear 508. The motor 504 could be an electric motor, a hydraulic motor, or a pneumatic motor. The pinion gear 508 is engaged with the teeth 444 of the cog rack 442 to form a rack and pinion assembly. The rack and pinion assembly is an actuator that moves the coupler 400 along the longitudinal axis 330. Rotation of the pinion gear 508 in a first direction moves the shank 304 (and the remainder of the coupler 400) in a first direction (indicated by arrow B) along the longitudinal axis 330 and rotation of the pinion gear 508 and a second opposite direction moves the shank 304 (and the remainder of the coupler 400) in a second direction (indicated by arrow C) along the longitudinal axis 330. In the aspect illustrated in FIGS. 5A-5C, the pin retention mechanism 500 includes two motor assemblies 502 with respective pinion gears 508 arranged on opposite sides of the cog rack 442. The motor assemblies 502 may include a reduction gearbox 506 that increases the torque transmitted to the pinion gears 508 from the motors 504. Such a reduction gearbox 506 may also prevent or discourage back driving of the motors 504 by forces imparted on the coupler 400 by the bottom corner fitting 120.

FIGS. 5A and 5B are front perspective views of the pin retention mechanism 500 with the housing 542 attached to the mounting plate 510, and with the coupler 400 in retracted and extended positions, respectively. The housing 542 includes bottom surfaces 560 that mate with the mounting surfaces 512 of the mounting plate 510. The housing 542 includes recesses 546 with fastener holes 548 arranged therein. The fastener holes 548 in the recesses 546 are aligned with the fastener holes 516 and the mounting plate 510 such that fasteners can be inserted through the fastener holes 518 and secured in the fastener holes 516 and the mounting plate. For example, the fastener holes 516 and the mounting plate 510 may be threaded, and threaded bolts may be passed through the fastener holes 548 in the housing 542 to engage the threads in the fastener holes 516 of the mounting plate 510. The motor assemblies 502 are attached to the housing 542 via fasteners (e.g., bolts or rivets). The housing 542 includes apertures (not shown) that allow the pinion gears 508 to extend through the housing 542 to engage the cog rack 442 of the coupler 400.

The housing 542 defines a main body 544 that is engaged with the mounting plate 510 and a secondary body 550 that at least partly covers the coupler 400, when the coupler 400 is in the retracted position illustrated in FIG. 5B. The secondary body 550 is separated from the mounting plate 510 by a gap 554 at a first end 558 of the housing 542. Moving in a direction along the longitudinal axis 330 in the direction of arrow C toward a second end 556 of the housing 542, the secondary body 550 joins the main body 544. Returning to the first end 558 of the housing 542, the secondary body 550 is connected to the main body 544 via a bridge member 552 that covers the shank 304 of the coupler 400.

In the illustrated aspect, the bottom support 312 of the coupler 400 is arranged in the gap 554 between the mounting plate 510 and the secondary body 550. FIG. 5B illustrates the coupler 400 in a fully retracted position and FIG. 5C illustrates the coupler 400 in a fully extended position. As discussed above, to move the coupler 400 from the retracted position shown in FIG. 5B to the extended position shown in FIG. 5C, the motors 504 rotate the respective pinion gears 508 to move the coupler 400 along the longitudinal axis 330 in the direction of arrow B. Conversely, to move the coupler 400 from the extended position shown in FIG. 5C to the retracted position shown in FIG. 5B, the motors 504 rotate the respective pinion gears 508 and opposite direction to move the coupler 400 along the longitudinal axis 330 in the direction of arrow C.

In the event an intermodal cargo container 100 experiences vertical and/or forward loads while secured by the pin retention mechanism 500, such loads would be transmitted through the bottom corner fittings 120 to the couplers 400. The couplers 400, in turn, would transmit the load to the housing 542 and to the mounting plate 510. The mounting plate 510 will then transmit the load to the rail 202 or 204 to which it is mounted.

Figure 6A:
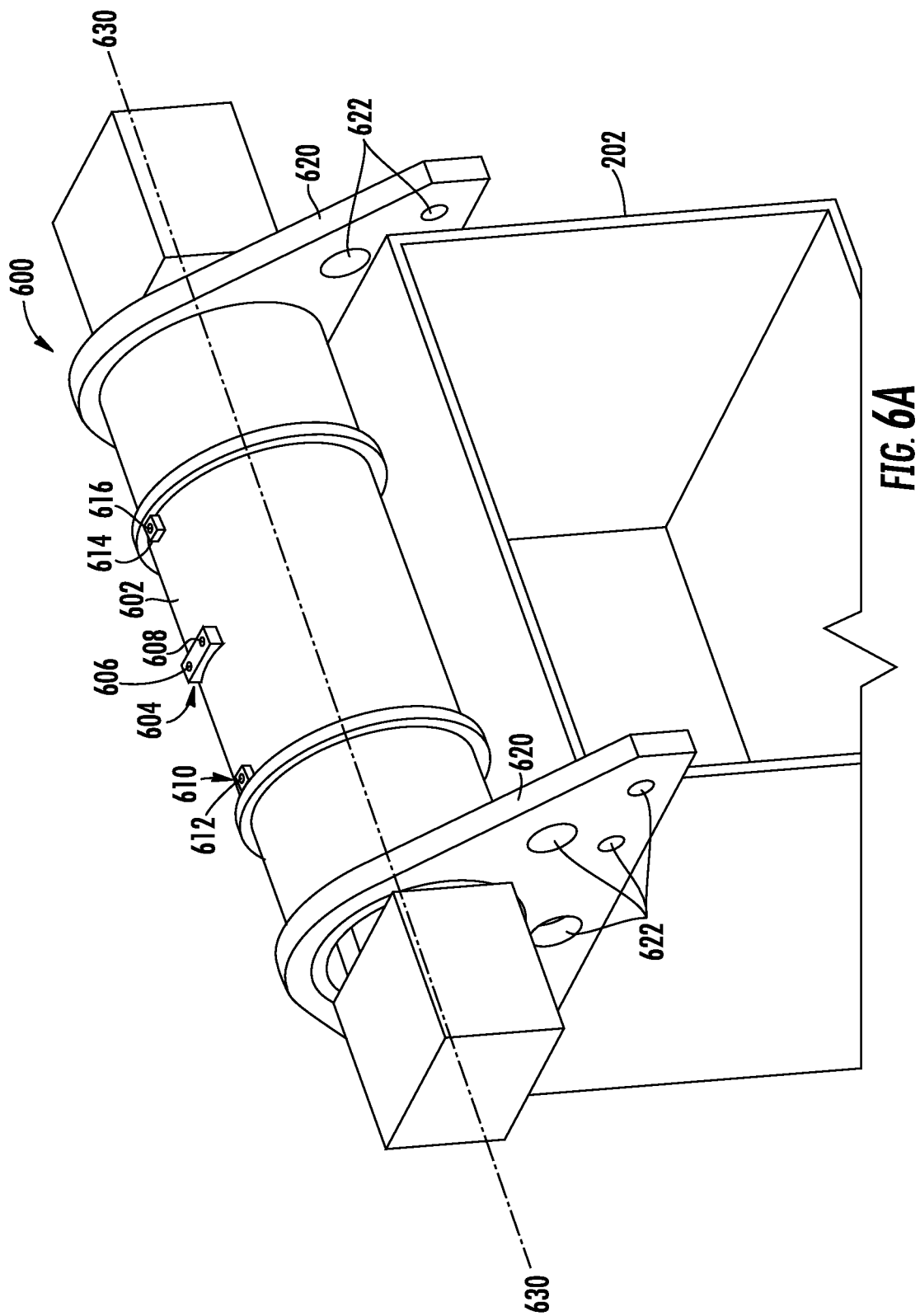
FIG. 6A is a perspective view of a housing and actuator for moving a coupler.
Figure 6B:
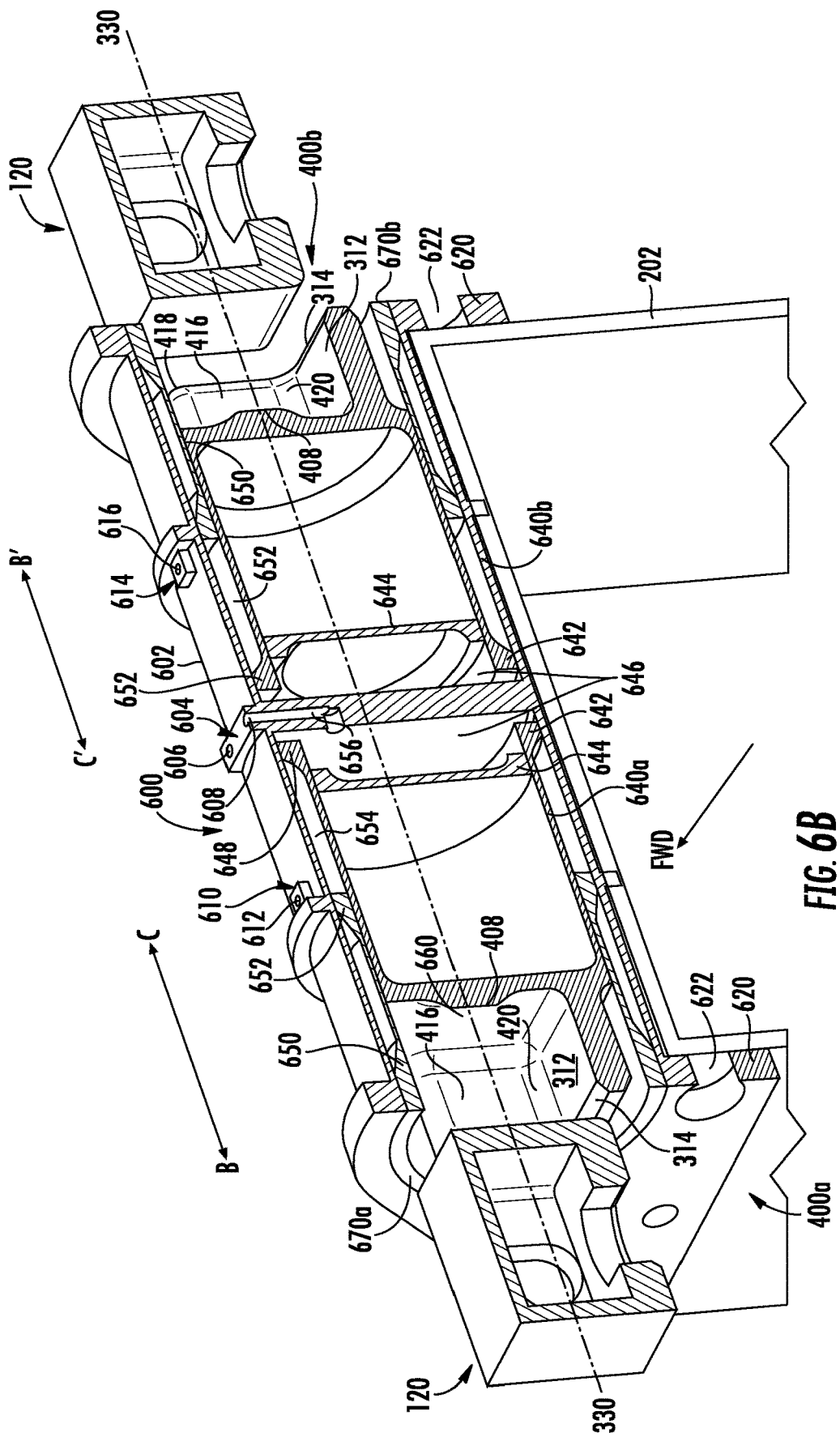
FIG. 6B is a first cross-sectional perspective view of the housing and actuator of FIG. 6A.
Figure 6C:
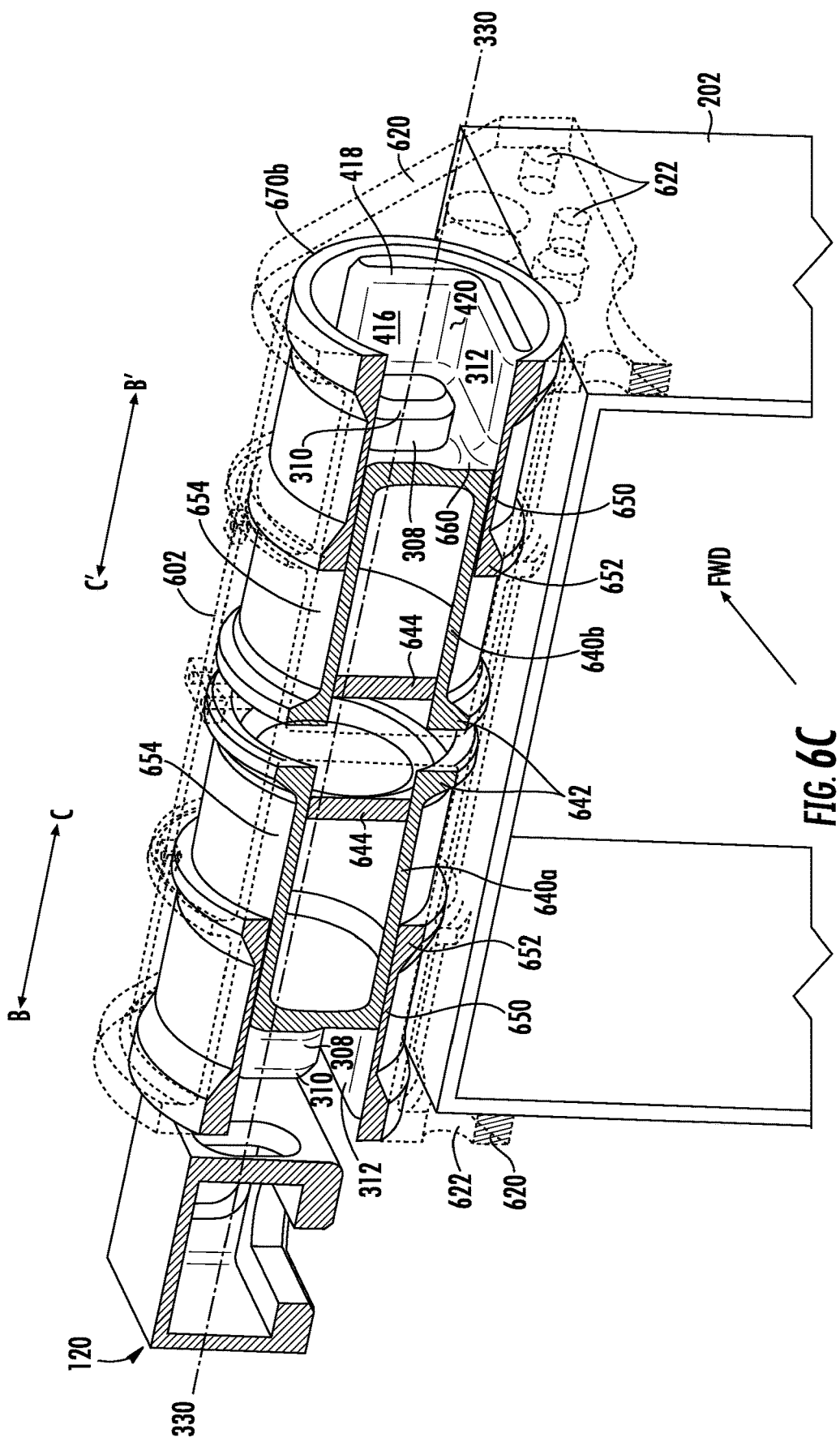
FIG. 6C is a second cross-sectional perspective view of the housing and actuator of FIG. 6A.

FIGS. 6A-6C illustrate another exemplary aspect of a pin retention mechanism 600 that uses hydraulically-actuated cylinders to move couplers between an extended position and a retracted position along a longitudinal axis 330 through the pins 308 of the couplers 400 arranged on outward-facing surfaces of the hydraulically-actuated cylinders. The pin retention mechanism 600 illustrated in FIG. 6A-6C are shown with the pin 308, bottom support 312, and sidewall support 416 of the coupler 400 shown in FIGS. 4A-4B. In other aspects, the pin retention mechanism 600 could instead include the pin 308 and bottom support 312 of the coupler 300 shown in FIGS. 3A-3B.

Referring to FIG. 6A, the pin retention mechanism 600 includes a hydraulic cylinder body 602 that is connected to the rail 202 or the rail 204 of the frame 200 via flanges 620. The flanges 620 include holes 622 through which fasteners may be inserted to secure the flanges 620 to the rail 202. The flanges 620 may be integral with the hydraulic cylinder body 602 or may be attached to the hydraulic cylinder body 602 via welding, for example.

The hydraulic cylinder body 602 includes bosses 604, 610, and 614 arranged thereon. The boss 604 includes hydraulic ports 606 and 608, through which hydraulic fluid can flow into and out of the hydraulic cylinder body 602. The boss 610 includes a hydraulic port 612 and the boss 614 includes a hydraulic port 616.

FIG. 6B is a cross-sectional view of the pin retention mechanism 600 and illustrates two hydraulic pistons 640a and 640b arranged within the hydraulic cylinder body 602. The first hydraulic piston 640a actuates the coupler 400 arranged toward a first side of the rail 202 and the second hydraulic piston 640b actuates a coupler 400b arranged toward a second side of the rail 202. The hydraulic pistons 640a and 640b and the hydraulic cylinder body 602 form first chambers 646 that, when filled with pressurized hydraulic fluid, push the hydraulic pistons 640a and 640b in the directions of arrows B and B', respectively, along the longitudinal axis 330. The hydraulic pistons 640a and 640b, the hydraulic cylinder body 602, and hydraulic cylinder inserts 650 form second chambers 654 that, when filled with pressurized hydraulic fluid, push the hydraulic pistons 640a and 640b in the directions of arrows C and C', respectively, along the longitudinal axis 330.

The hydraulic pistons 640a and 640b include lips 642 that engage interior walls of the hydraulic cylinder body 602. The hydraulic pistons 640a and 640b also include plugs 644 arranged within or on interior-facing ends of the hydraulic pistons 640a and 640b. The plugs 644 and lips 642 of the hydraulic piston 640a and 640b and the hydraulic cylinder body 602 form the first chambers 646. Pressurized hydraulic fluid can enter the chamber 646 for the hydraulic piston 640a through the hydraulic port 608 and a channel 656. The pressurized hydraulic fluid pushes the hydraulic piston 640a in the direction of arrow B along the longitudinal axis 330. The other hydraulic piston 640b is similarly pushed in the direction of arrow B' along the longitudinal axis 330 by hydraulic fluid entering through the hydraulic port 606 (and another channel that is not shown in FIG. 6B). The lips 642 of the hydraulic pistons 640a and 640b include opposing surfaces 648 that, in combination with the hydraulic pistons 640a and 640b and lips 652 of the hydraulic cylinder inserts 650, form the second chambers 654. Pressurized hydraulic fluid can enter the chamber 654 for the first hydraulic piston 640a via the hydraulic port 612 through the hydraulic cylinder body 602. Likewise, hydraulic fluid can enter the second chamber 654 for the second hydraulic piston 640b via the hydraulic port 616 through the hydraulic cylinder body 602. The pressurized hydraulic fluid entering the chambers 654 pushes the hydraulic pistons 640a and 640b in the directions of arrows C and C', respectively, along the longitudinal axis 330.

In the aspect shown in FIGS. 6A-6C, the couplers 400a and 400b are formed on outward-facing surfaces 660 of the hydraulic pistons 640a and 640b. In the exemplary aspect, the shanks 304 of the coupler described in FIGS. 4A-4B are omitted. However, in other embodiments, the shanks 304 could be included, and the shanks 304 could be connected to the outward-facing surfaces 660 of the hydraulic piston 640a and 640b. FIG. 6B illustrates a cross-sectional view taken approximately halfway through the hydraulic cylinder body 602. As a result, the pins 308 are only partly visible. FIG. 6C illustrate a cross-sectional view taken at a shallower depth through the hydraulic cylinder body 602 such that the pins 308 having the longitudinal axis 330, formed on the outward-facing surfaces 660 of the hydraulic pistons 640a and 640b, are almost entirely visible. The pins 308 extend from the outward-facing surfaces 660 of the hydraulic pistons 640a and 640b along the longitudinal axis 330. FIGS. 6B and 6C also illustrate the bottom supports 312 of the couplers 400 formed on the outward-facing surfaces 660 of the hydraulic pistons 640a and 640b and extending away from the outward-facing surfaces 660 along the longitudinal axis 330. Likewise, FIGS. 6B and 6C illustrate the sidewall supports 416 of the couplers 400 formed on the outward-facing surfaces 660 of the hydraulic piston 640a and 640b and extending away from the outward-facing surfaces 660 along the longitudinal axis 330.

FIGS. 6A-6C illustrate the hydraulic pistons 640a and 640b in retracted positions, in which the pins 308, bottom supports 312, and sidewall supports 416 do not extend beyond ends 670a and 670b of the hydraulic cylinder body 602. In various aspects, at least portions of the pins 308, bottom supports 312, and sidewall supports 416 could extend beyond the ends 670a and 670b of the hydraulic cylinder body 602. When the first chambers 646 are filled with pressurized hydraulic fluid, the hydraulic pistons 640a and 640b move in the directions of arrows B and B', respectively, to an extended position in which the pins 308, bottom supports 312, and sidewall supports 416 of the couplers 400 engage bottom corner fittings 120 of the intermodal cargo containers 100.

The pin retention mechanism 600 illustrated in FIG. 6A-6C is configured to couple to a first bottom corner fitting 120 of a first intermodal cargo container 100 and to a second bottom corner fitting 120 of a second intermodal cargo container 100, wherein the first and second intermodal cargo containers 100 are arranged in a side-by-side manner with a rail (e.g., rail 202) of a frame (e.g., the frame 200) arranged therebetween. When viewed facing the forward direction, the coupler 400a of the first hydraulic piston 640a engages a front right-hand bottom corner fitting 120 of the first intermodal cargo container 100 and the coupler 400b of the second hydraulic piston 640b engages a front left-hand bottom corner fitting 120 of the second intermodal cargo container 100. Accordingly, the sidewall supports 416 for the first hydraulic piston 640a and the second hydraulic piston 640b are arranged to engage a right-hand bottom corner fitting 120 and a left-hand bottom corner fitting 120, respectively. For pin retention mechanism 600 that may engage the rear bottom corner fittings 120 of the first and second intermodal cargo containers 100, the sidewall supports 416 can be omitted such that only a pin (e.g., the pin 308 of the coupler 300) and a bottom support (e.g., the bottom support 312 of the coupler 300) extend from the outward-facing surface 660 of the hydraulic pistons 640a and 640b along the longitudinal axis 330.

In at least one aspect, pin retention mechanisms configured to engage rear bottom corner fittings 120 may include sidewall supports (e.g., sidewall supports 416) arranged to abut rear facing side walls of the bottom corner fittings 120. Referring again to FIGS. 1A and 1B, the intermodal cargo container 100 can generally be stacked with either the first end 102 or the second end 104 facing forward. As such, the bottom corner fittings 120 are often identical. Therefore, for the bottom corner fitting 120 illustrated in FIG. 1B located at a rear corner of the intermodal cargo container 100, the forward-facing side wall 126 is rear-facing. Thus, a sidewall support arranged to abut rear facing sidewall would abut side wall 126 with the pin (e.g., the pin 308) inserted through the aperture 134 in the sidewall 128.

In certain circumstances, it may be advantageous to omit such a sidewall support to abut the rear facing side walls of the bottom corner fittings 120 at the rear facing and of an intermodal cargo container 100. For example, such a sidewall support arranged to abut the rear facing side walls of the bottom corner fittings 120 requires space that may limit how closely intermodal cargo containers 100 arranged end to end can be placed.

FIGS. 7A and 7B illustrate a pin retention mechanism arrangement 700 on a rail 202 of a frame 200 and a vehicle. The pin retention mechanism arrangement 700 includes a first pin retention mechanism 702 and a second pin retention mechanism 730. Referring primarily to FIG. 7B, the first pin retention mechanism 702 includes a coupler 400 with a pin 308 having a first longitudinal axis 330a, a bottom support 312, and a sidewall support 416 to support a bottom corner fitting 120 at the forward-facing end of an intermodal cargo container 100. The second pin retention mechanism 730 includes a coupler 300 that includes a pin 308 having a longitudinal axis 330b and a bottom support 312. The second pin retention mechanism 730 omits a sidewall support that could support a rear-facing sidewall of a bottom corner fitting 120 at a rear-facing end of an intermodal cargo container 100. The pin 308 of the first pin retention mechanism 702 and the pin 308 of the second pin retention mechanism 730 are spaced a distance F apart. If the second pin retention mechanism 702 included a sidewall support and was, essentially, a mirror image of the first pin retention mechanism, then the distance F between the pins 308 and 308 of the first and second pin retention mechanisms 702 and 730 would be greater. As a result, the two intermodal cargo containers 100 arranged end to end would have a larger gap therebetween. Such an increased gap may reduce the number of intermodal cargo containers 100 that a particular vehicle can carry. In circumstances in which the intermodal cargo containers 100 are not expected to encounter significant accelerations in the aft direction during travel, such sidewall supports (e.g., sidewall supports 416) can be omitted for couplers that will only engage bottom corner fittings 120 at the rear-facing ends of the intermodal cargo containers 100.

FIG. 8 illustrates another aspect of a coupler 800 for a pin retention mechanism aligned for engagement with a corner fitting 120. In this aspect, the coupler 800 omits the pin 308. The coupler 800 includes the bottom support 312 and the sidewall support 416 protruding from a surface 802. In this aspect, when the coupler 800 engages the corner fitting 120, the bottom support 312 of the coupler 800 abuts the bottom surface 130 of the corner support 120, the sidewall support 416 of the coupler 800 abuts the sidewall 126 of the corner fitting 120, and the surface 802 of the coupler 800 abuts the sidewall 128 of the corner fitting 120.

FIG. 9A is a perspective view of an intermodal cargo container 100 with eight pin retention mechanisms 830 arranged at the respective eight corner fittings 120 and 122 of the intermodal cargo container 100. The eight pin retention mechanisms 830 include respective couplers 800. FIG. 9B is a detail perspective view of a corner fitting 122 along the top 108 of the intermodal cargo container 100. The corner fittings 122 along the top of the intermodal cargo container 100 are identical to the corner fittings 120 along the bottom 110 of the intermodal cargo container 100, but are oriented such that the bottom surfaces 130 of the bottom corner fittings 120 are top surfaces 130' of the top corner fittings 122. Likewise, the couplers 800 of the pin retention mechanisms 830 arranged with the corner fittings 122 along the top 108 of the intermodal cargo container 100 are oriented such that the bottom supports 312 are top supports 312'.

Returning to FIG. 9A, with the couplers 800 properly oriented and engaged with the respective corner fittings 120 and 122 of the intermodal cargo container 100, the pin retention mechanisms 830 constrain the pin retention mechanisms 830 in all directions. For example, the bottom supports 312 and top supports 312' of the couplers 800 abutting the respective bottom surfaces 130 and top surfaces 130' of the corner fittings 120 and 122 exert forces $F_V$ on the corner fittings 120 and 122, resisting vertical motion of the intermodal cargo container 100. As another example, the sidewall supports 416 abutting the sidewalls 126 of the corner fittings 120 and 122 exert forces $F_M$ on the corner fittings 120 and 122, resisting fore and aft motion of the intermodal cargo container 100. As another example, the surfaces 802 of the couplers 800 abutting the sidewalls 128 of the corner fittings 120 and 122 exert forces $F_L$ on the corner fittings 120 and 122, resisting lateral motion of the intermodal cargo container 100.

In various aspects in which pin actuation mechanisms are provided at all eight corner fittings 120 and 122 of an intermodal cargo container 100, the pin actuation mechanisms could include the couplers 300 and/or the couplers 400, discussed above. The pins 308 of the couplers 300 and 400 could provide extra support to the corner fittings 120 and 122 in the fore and aft directions and in the vertical directions. Returning again to FIG. 1A, as discussed above, intermodal cargo containers 100 typically have one of several standardized lengths, such as 20 feet or 40 feet. Accordingly, the bottom corner fittings 120 of such intermodal cargo containers 100 are arranged at standardized distances between the ends 102 and 104 of the intermodal cargo containers 100. However, some intermodal cargo containers may include non-standard lengths such that distances between bottom corner fittings 120 between the ends 102 and 104 may differ from standard distances. Furthermore, even for the intermodal cargo containers 100 having standardized lengths, there may be slight distance variations between the bottom corner fittings 120 between the ends 102 and 104 due to, e.g., manufacturing tolerances, temperature variations, and/or deformation of the intermodal cargo containers 100.

Referring again to FIGS. 2A-2C, in various aspects, at least some of the pin retention mechanisms may be movable along the rails 202 and 204 to accommodate nonstandard distances between bottom corner fittings 120 between the ends 102 and 104 of the intermodal cargo containers 100. At least one aspect, the pin retention mechanisms 206a and 206b supporting the bottom corner fittings 120 at the forward facing end 102 of the intermodal cargo container 100 may be fixed in place on the rails 202 and 204. The pin retention mechanisms 208 supporting bottom corner fittings 120 at the rear facing end 104 of the intermodal cargo container 100 may be adjustable in the directions of arrows D and E along the rails 202 and 204. For example, the pin retention mechanisms 208 could be connected to the rails 202 and 204 via cam locks or other selectively releasable fasteners. Such fasteners could be selectively released to allow the pin retention mechanisms 208 to be aligned with the bottom corner fittings 120 at the rear facing and 104 of the intermodal cargo container 100. Thereafter, the fasteners could be selectively activated such that the pin retention mechanisms 208 are held in place along the rails 202 and 204.

In use, an intermodal cargo container 100 would be inserted between the rails 202 and 204 in the direction of arrow A, shown in FIGS. 2A and 2B. Sensors 240, such as cameras coupled to machine vision, can monitor positions of the bottom corner fittings 120 relative to the pin retention mechanisms 206a, 206b, and 208, and communicate the monitored positions to a controller 250. Alternatively, alignment could be visually confirmed by a human operator. When the bottom corner fittings 120 at the first end 102 (i.e., the forward-facing end) of the intermodal cargo container 100 are aligned with the pin retention mechanisms 206a and 206b, the intermodal cargo container 100 is stopped. Thereafter, the pin retention mechanisms 208 can be moved in the directions of arrows D or E such that the pin retention mechanisms 208 are aligned with the bottom corner fittings 120 at the second end 104 (i.e., the rear-facing end) of the intermodal cargo container 100. Thereafter, the pin retention mechanisms 208 can be affixed to the rails 202 and 204, respectively. After the pin retention mechanisms 206a, 206b, and 208 are aligned with the respective bottom corner fittings 120 of the intermodal cargo container 100, the pin retention mechanisms 206a, 206b, and 208 are actuated to move the respective couplers (e.g., couplers 300 or 400) from retracted positions to extended positions to engage the respective bottom corner fittings 120. For example, the controller 250 could actuate the pin retention mechanisms 208.

In the aspects described above, the pin retention mechanisms are described with reference to an intermodal cargo container 100. In various circumstances, the pin retention mechanisms described herein could be applied to other types of cargo containers that include standardized coupler connections.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. A method for securing an intermodal cargo container, comprising:
   aligning an intermodal cargo container relative to first and second rails of a support frame, wherein the first and second rails include respective first and second pin retention mechanisms thereon, each of the first and second pin retention mechanisms comprising:
   a housing attached to the first or second rail;
   a coupler reciprocally actuatable between a retracted position and an extended position and comprising:
      a pin having a longitudinal axis, the pin being sized and oriented to enter an aperture in a sidewall of one or more corner fittings of the intermodal cargo container when the coupler is moved into the extended position; and
      a bottom support in a fixed, spaced apart relationship relative to the pin, thereby defining a vertical gap sized to receive a bottom surface of the one or more corner fittings when the coupler is moved into the extended position; and
   an actuator coupled to the housing and operable to move the pin and the bottom support of the coupler from the retracted position to the extended position and from the extended position to the retracted position along the longitudinal axis.

2. The method of claim 1, wherein the bottom support includes a chamfered edge along a pin-facing surface of the bottom support.

3. The method of claim 1, wherein the coupler further comprises a sidewall support in a fixed, space apart relationship relative to the pin, thereby defining a lateral gap sized to receive another sidewall of the one or more corner fittings when the coupler is moved into the extended position.

4. The method of claim 3, wherein the sidewall support includes a chamfered edge along a pin-facing surface of the sidewall support.

5. The method of claim 3, wherein the bottom support includes a first chamfered edge along a first pin-facing surface of the bottom support, and wherein the sidewall support includes a second chamfered edge along a second pin-facing surface of the sidewall support.

6. The method of claim 3, wherein the bottom support and sidewall support are monolithic.

7. The method of claim 1, wherein the one or more corner fittings comprise a first and a second corner fitting and the pin comprises a first pin and a second pin, the method further comprising:
   actuating the actuator of the first and second pin retention mechanisms from the retracted position to the extended position such that the first pin and the second pin and bottom supports of the first and second pin retention mechanisms engage respective first and second corner fittings on opposite sides of the intermodal cargo container.

8. The method of claim 7, wherein the coupler further comprises sidewall supports extending away from the actuator, wherein the sidewall supports are spaced apart from the first and second pins such that the first and second pins are insertable into apertures of the first and second corner fittings of the intermodal cargo container when the sidewall supports abut other sidewalls of the first and second corner fittings.

9. A method for securing an intermodal cargo container, comprising:
aligning an intermodal cargo container relative a frame of a vehicle, wherein the frame includes first and second rails that are spaced apart to fit an intermodal cargo container there-between;
a first pin retention mechanism arranged on the first rail, the first pin retention mechanism comprising:
a first housing attached to the first rail;
a first coupler reciprocally actuatable between a retracted position and an extended position and comprising:
a first pin having a first longitudinal axis, the first pin being sized and oriented to enter an aperture in a sidewall of a first corner fitting of the intermodal cargo container when the first coupler is moved into the extended position; and
a first bottom support in a fixed, spaced apart relationship relative to the first pin, thereby defining a first vertical gap sized to receive a bottom surface of the first corner fitting when the first coupler is moved into the extended position; and
a first actuator coupled to the first housing and operable to move the first coupler between the retracted position and the extended position along the first longitudinal axis; and
a sensor operable to detect alignment of the first coupler with the first corner fitting of the intermodal cargo container; and
a controller in communication with the sensor, wherein the controller is operable to command the first actuator to move from the retracted position to the extended position upon the sensor detecting alignment of the first coupler with the first corner fitting of the intermodal cargo container.

10. The method of claim 9, wherein the first bottom support includes a first chamfered edge along a first pin-facing surface of the first bottom support.

11. The method of claim 9, wherein the first coupler further comprises a first sidewall support in a fixed, spaced apart relationship relative to the first pin, thereby defining a first lateral gap sized to receive another sidewall of the first corner fitting when the first coupler is moved into the extended position.

12. The method of claim 11, wherein the first bottom support includes a first chamfered edge along a first pin-facing surface of the first bottom support, and wherein the first sidewall support includes a second chamfered edge along a pin-facing surface of the first sidewall support.

13. The method of claim 11, wherein the first bottom support and first sidewall support are monolithic.

14. The method of claim 11, wherein the first corner fitting is arranged at a first end of the intermodal cargo container, wherein the intermodal cargo container includes a second corner fitting arranged at the first end and third and fourth corner fittings arranged on an opposing second end, and wherein the vehicle further comprises:
a second pin retention mechanism arranged on the second rail, the second pin retention mechanism comprising:
a second housing attached to the second rail;
a second coupler reciprocally actuatable between a retracted position and an extended position and comprising:
a second pin having a second longitudinal axis, the second pin being sized and oriented to enter an aperture in a sidewall of the second corner fitting of the intermodal cargo container when the second coupler is moved into the extended position; and
a second bottom support in a fixed, spaced apart relationship relative to the second pin, thereby defining a second vertical gap sized to receive a bottom surface of the second corner fitting when the second coupler is moved into the extended position; and
a second actuator coupled to the second housing and operable to move the second coupler between the retracted position and the extended position along the second longitudinal axis;
a third pin retention mechanism arranged on the first rail, the third pin retention mechanism comprising:
a third housing attached to the first rail;
a third coupler reciprocally actuatable between a retracted position and an extended position and comprising:
a third pin having a third longitudinal axis, the third pin being sized and oriented to enter an aperture in a sidewall of the third corner fitting of the intermodal cargo container when the third coupler is moved into the extended position; and
a third bottom support in a fixed, spaced apart relationship relative to the third pin, thereby defining a third vertical gap sized to receive a bottom surface of the third corner fitting when the third coupler is moved into the extended position; and
a third actuator coupled to the third housing and operable to move the third coupler between the retracted position and the extended position along the third longitudinal axis; and
a fourth pin retention mechanism arranged on the second rail, the fourth pin retention mechanism comprising:
a fourth housing attached to the second rail;
a fourth coupler reciprocally actuatable between a retracted position and an extended position and comprising:
a fourth pin having a fourth longitudinal axis, the fourth pin being sized and oriented to enter an aperture in a sidewall of the fourth corner fitting of the intermodal cargo container when the fourth coupler is moved into the extended position; and
a fourth bottom support in a fixed, spaced apart relationship relative to the fourth pin, thereby defining a fourth vertical gap sized to receive a bottom surface of the fourth corner fitting when the fourth coupler is moved into the extended position; and
a fourth actuator coupled to the fourth housing and operable to move the fourth coupler between the retracted position and the extended position along the fourth longitudinal axis.

15. The method of claim 14, wherein the third pin retention mechanism is movable along the first rail and the fourth pin retention mechanism is movable along the second rail.

16. The method of claim 14, further comprising:
a second sensor operable to detect alignment of the second coupler with the second corner fitting of the intermodal cargo container;

wherein the controller is in communication with the second sensor, wherein the controller is operable to command the second actuator to move from the retracted position to the extended position upon the second sensor detecting alignment of the second coupler with the second corner fitting of the intermodal cargo container.

17. A method for securing an intermodal cargo container, comprising:
  aligning an intermodal cargo container relative to first and second rails of a support frame, wherein the first and second rails include respective first and second pin retention mechanisms thereon, the first and second pin retention mechanisms comprising:
    a first housing attached to the first or second rail;
    a first coupler reciprocally actuatable between a retracted position and an extended position and comprising:
      a first pin having a first longitudinal axis, the first pin being sized and oriented to enter an aperture in a sidewall of a first corner fitting or a second corner fitting of the intermodal cargo container when the first coupler is moved into the extended position; and
      a first bottom support in a fixed, spaced apart relationship relative to the first pin, thereby defining a first vertical gap sized to receive a bottom surface of the first corner fitting or the second corner fitting when the first coupler is moved into the extended position; and
    a first actuator coupled to the first housing and operable to move the first pin and the first bottom support of the first coupler between the retracted position and the extended position along the first longitudinal axis; and
  actuating the first actuator of the first and second pin retention mechanisms from the retracted position to the extended position such that the first pin and the first bottom support of the first and second pin retention mechanisms engage respective first and second corner fittings on opposite sides of the intermodal cargo container.

18. The method of claim 17, wherein the first coupler further comprises sidewall supports extending away from the first actuator wherein the sidewall supports are spaced apart from the first pins of the first and second pin retention mechanisms such that the first pins are insertable into apertures of the first and second corner fittings of the intermodal cargo container when the sidewall supports abut other sidewalls of the first and second corner fittings.

19. The method of claim 18, wherein the first and second rails include respective third and fourth pin retention mechanisms thereon, the third and fourth pin retention mechanisms comprising:
  a second housing attached to the first or second rail;
  a second coupler reciprocally actuatable between a retracted position and an extended position and comprising:
    a second pin having a second longitudinal axis, the second pin being sized and oriented to enter an aperture in a sidewall of a corner fitting of the intermodal cargo container when the second coupler is moved into the extended position; and
    a second bottom support in a fixed, spaced apart relationship relative to the second pin, thereby defining a second vertical gap sized to receive a bottom surface of the corner fitting when the second coupler is moved into the extended position; and
  a second actuator coupled to the second housing and operable to move the second coupler between the retracted position and the extended position along the second longitudinal axis; and
  wherein the method further comprises actuating the actuators of the third and fourth pin retention mechanisms from the retracted position to the extended position such that the second pins and bottom supports of the third and fourth pin retention mechanisms engage respective third and fourth corner fittings the intermodal cargo container, where the third and fourth corner fittings are arranged at an opposite end of the intermodal cargo container from the first and second corner fittings.

20. The method of claim 19, wherein aligning the intermodal cargo container relative to first and second rails of a support frame comprises aligning the first and second corner fittings of the intermodal cargo container with the first and second pin retention mechanisms, and wherein the method further comprises adjusting positions of the third and fourth pin retention mechanisms along the first and second rails, respectively, to align the second coupler of the third and fourth pin retention mechanisms with the third and fourth corner fittings after the first and second corner fittings are aligned with the first coupler of the first and second pin retention mechanisms.

* * * * *

UNITED STATES PATENT AND TRADEMARK OFFICE
CERTIFICATE OF CORRECTION

PATENT NO. : 11,529,902 B2
APPLICATION NO. : 16/546822
DATED : December 20, 2022
INVENTOR(S) : Max U. Kismarton et al.

Page 1 of 1

It is certified that error appears in the above-identified patent and that said Letters Patent is hereby corrected as shown below:

On the Title Page

Item (56), in Column 2, under "Other Publications", Line 1, delete "rittps://" and insert -- https:// --.

In the Claims

In Column 20, Line 31 (approx.), in Claim 19, after "fittings" insert -- of --.

Signed and Sealed this
Twenty-fifth Day of April, 2023

Katherine Kelly Vidal
*Director of the United States Patent and Trademark Office*